US012562519B2

(12) United States Patent
Cheng et al.

(10) Patent No.: US 12,562,519 B2
(45) Date of Patent: Feb. 24, 2026

(54) TERMINAL FOR ELECTRICAL CONNECTOR, ELECTRICAL CONNECTOR AND METHOD OF MANUFACTURING THE SAME

(71) Applicant: Amphenol Commercial Products (Chengdu) Co., Ltd., Chengdu (CN)

(72) Inventors: Yanming Cheng, Chengdu (CN); Chao Zou, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 506 days.

(21) Appl. No.: 17/994,505

(22) Filed: Nov. 28, 2022

(65) Prior Publication Data

US 2024/0145959 A1 May 2, 2024

(30) Foreign Application Priority Data

Oct. 28, 2022 (CN) ......................... 202211334897.2
Oct. 28, 2022 (CN) ......................... 202222859336.6

(51) Int. Cl.
*H01R 12/73* (2011.01)
*H01R 12/70* (2011.01)
(Continued)

(52) U.S. Cl.
CPC ......... *H01R 12/73* (2013.01); *H01R 12/7005* (2013.01); *H01R 12/721* (2013.01); *H01R 13/2407* (2013.01); *H01R 13/2457* (2013.01)

(58) Field of Classification Search
CPC ........................... H01R 12/737; H01R 12/721; H01R 12/7005; H01R 13/113; H01R 13/2407; H01R 13/2457; H01R 13/055
(Continued)

(56) References Cited

U.S. PATENT DOCUMENTS 4,040,713 A 8/1977 Konnemann
4,687,267 A 8/1987 Header et al.
(Continued)

FOREIGN PATENT DOCUMENTS

CN 1275825 A 12/2000
CN 102804512 A 11/2012
(Continued)

OTHER PUBLICATIONS

Chinese Office Action dated Jul. 4, 2022 in connection with Chinese Application No. 201980089491.2.
(Continued)

*Primary Examiner* — Marcus E Harcum
(74) *Attorney, Agent, or Firm* — Wolf, Greenfield & Sacks, P.C.

(57) ABSTRACT

A method of manufacturing an electrical connector includes (a) inserting a first end of an electrically conductive terminal into a compartment of an insulative housing; (b) inserting joining plates of the terminal into a slot of the compartment; and (c) seating the joining plates in the slot such that portions of lateral edges of the joining plates abut slot endwalls and such that opposite surfaces of the slot prevent the joining plates from separating from each other. The seating of the joining plates includes sliding the joining plates into the slot such that slot ledges of the slot abut protrusions extending from a surface of the joining plates. After the seating of the joining plates, the slot ledges and a slot wall exert a compressive force on the joining plates.

40 Claims, 10 Drawing Sheets

(51) Int. Cl.
*H01R 12/72* (2011.01)
*H01R 13/24* (2006.01)

(58) Field of Classification Search
USPC .......................................... 439/59, 60, 637
See application file for complete search history.

(56) References Cited

U.S. PATENT DOCUMENTS

| | | | | |
|---|---|---|---|---|
| 4,734,041 | A | 3/1988 | Bruchmann et al. | |
| 5,024,609 | A | 6/1991 | Piorunnek | |
| 5,162,002 | A | 11/1992 | Regnier | |
| 6,358,061 | B1 * | 3/2002 | Regnier | H01R 13/6471 439/515 |
| 6,575,774 | B2 * | 6/2003 | Ling | H01R 13/53 439/607.09 |
| 6,645,012 | B2 | 11/2003 | Ito et al. | |
| 6,652,322 | B2 | 11/2003 | Ito et al. | |
| 6,685,512 | B2 | 2/2004 | Ooya | |
| 7,104,812 | B1 | 9/2006 | Bogiel et al. | |
| 7,247,062 | B1 | 7/2007 | Polnyi | |
| 7,637,783 | B2 | 12/2009 | Sasaoka et al. | |
| 7,744,376 | B2 * | 6/2010 | Vrenna | H01R 12/716 439/60 |
| 7,985,097 | B2 | 7/2011 | Gulla | |
| 8,202,117 | B2 | 6/2012 | Pan | |
| 8,480,434 | B2 | 7/2013 | Funayama et al. | |
| 8,550,855 | B2 | 10/2013 | Zhang et al. | |
| 8,651,880 | B2 * | 2/2014 | Wu | H01R 13/113 439/79 |
| 8,672,713 | B2 | 3/2014 | Tajiri et al. | |
| 8,840,406 | B2 | 9/2014 | Hirata | |
| 9,054,456 | B2 | 6/2015 | Orris et al. | |
| 9,070,990 | B2 | 6/2015 | Flickinger et al. | |
| 9,160,105 | B2 | 10/2015 | Takaki | |
| 9,160,122 | B2 | 10/2015 | Sato | |
| 9,190,753 | B2 | 11/2015 | Takaki | |
| 9,196,986 | B2 | 11/2015 | Tanaka et al. | |
| 9,225,089 | B2 | 12/2015 | Sato | |
| 9,236,678 | B2 | 1/2016 | Joo et al. | |
| 9,287,654 | B2 | 3/2016 | Takaki | |
| 9,608,349 | B2 | 3/2017 | Mashiyama et al. | |
| 9,666,962 | B1 | 5/2017 | Bucher | |
| 9,800,004 | B1 * | 10/2017 | Schepis | H01R 4/305 |
| 9,935,385 | B2 | 4/2018 | Phillips et al. | |
| 9,941,613 | B2 | 4/2018 | Zhao | |
| 9,966,679 | B2 | 5/2018 | Xu et al. | |
| 10,096,920 | B2 | 10/2018 | Lee | |
| 10,128,589 | B2 | 11/2018 | Yamaguchi | |
| 10,553,976 | B1 * | 2/2020 | Thein | H01R 13/035 |
| 10,637,175 | B1 | 4/2020 | Zou et al. | |
| 10,826,215 | B2 * | 11/2020 | Zhang | H01R 4/025 |
| 10,873,146 | B2 | 12/2020 | Zou et al. | |
| 11,626,681 | B2 * | 4/2023 | Guo | H01R 12/7088 439/637 |
| 2002/0098743 | A1 * | 7/2002 | Schell | H01R 13/055 439/544 |
| 2002/0119704 | A1 | 8/2002 | Ito et al. | |
| 2009/0170373 | A1 | 7/2009 | Pan | |
| 2010/0184339 | A1 * | 7/2010 | Ngo | H01R 12/7088 439/682 |
| 2012/0252275 | A1 | 10/2012 | Tajiri et al. | |
| 2017/0054241 | A1 | 2/2017 | Sato et al. | |
| 2017/0373419 | A1 | 12/2017 | Lee | |
| 2018/0034174 | A1 | 2/2018 | Yamaguchi | |
| 2018/0097320 | A1 | 4/2018 | Hashiguchi | |
| 2018/0191093 | A1 | 7/2018 | Phillips et al. | |
| 2018/0212344 | A1 | 7/2018 | Li et al. | |
| 2019/0326697 | A1 * | 10/2019 | Ho | H01R 13/2442 |
| 2020/0153141 | A1 * | 5/2020 | Zhang | H01R 13/11 |
| 2020/0161791 | A1 | 5/2020 | Zou et al. | |
| 2020/0212616 | A1 | 7/2020 | Zou et al. | |
| 2020/0274277 | A1 * | 8/2020 | Taylor | H01R 13/245 |
| 2021/0376508 | A1 * | 12/2021 | Hu | H01R 13/2457 |
| 2022/0013942 | A1 | 1/2022 | Guo et al. | |
| 2022/0021142 | A1 | 1/2022 | Copper et al. | |
| 2022/0029333 | A1 * | 1/2022 | Horning | H01R 12/7088 |
| 2022/0131300 | A1 * | 4/2022 | Liu | H01R 4/489 |
| 2022/0209477 | A1 * | 6/2022 | Williford | H01R 4/489 |
| 2022/0263282 | A1 * | 8/2022 | Liu | H01R 24/60 |
| 2022/0285872 | A1 * | 9/2022 | Reedy | H01R 25/16 |
| 2022/0336976 | A1 * | 10/2022 | Henry | H01R 13/516 |
| 2023/0057532 | A1 * | 2/2023 | Lu | H01R 25/14 |
| 2023/0246373 | A1 | 8/2023 | Guo et al. | |
| 2024/0088592 | A1 * | 3/2024 | Liu | H01R 25/145 |

FOREIGN PATENT DOCUMENTS

| | | | |
|---|---|---|---|
| CN | 104103931 | A | 10/2014 |
| CN | 204668547 | U | 9/2015 |
| CN | 205583210 | U | 9/2016 |
| CN | 205846279 | U | 12/2016 |
| CN | 106299769 | A | 1/2017 |
| CN | 206301977 | U | 7/2017 |
| CN | 206727256 | U | 12/2017 |
| CN | 207183596 | U | 4/2018 |
| CN | 207381578 | U | 5/2018 |
| CN | 109326909 | A | 2/2019 |
| CN | 208939193 | U | 6/2019 |
| DE | 102017103604 | A1 | 8/2017 |
| DE | 102017213140 | A1 | 2/2018 |
| JP | 2016-110966 | A | 6/2016 |
| TW | M422792 | U | 2/2012 |
| TW | M561346 | U | 6/2018 |
| WO | WO 2017/193684 | A1 | 11/2017 |

OTHER PUBLICATIONS

International Preliminary Report on Patentability mailed Jun. 3, 2021 in connection with International Application No. PCT/CN2019/095891.

International Preliminary Report on Patentability mailed Jun. 3, 2021 in connection with International Application No. PCT/CN2019/095899.

International Search Report and Written Opinion mailed Oct. 14, 2019 in connection with International Application No. PCT/CN2019/095899.

International Search Report and Written Opinion mailed Sep. 27, 2019 in connection with International Application No. PCT/CN2019/095891.

Taiwanese Office Action dated Oct. 5, 2022 in connection with Taiwanese Application No. 108142216.

[No Author Listed], New Product: High Density Plus (HD+) Card Edge Power Connectors. TE Connectivity. Nov. 27, 2018. 3 pages. URL:https://www.te.com/usa-en/about-te/news-center/new-hd-plus-card-edge-connectors.html [retrieved on May 18, 2021].

Zou et al., Electrical Connector And Power Terminal, U.S. Appl. No. 18/517,521, filed Nov. 22, 2023.

* cited by examiner

FIG. 2A
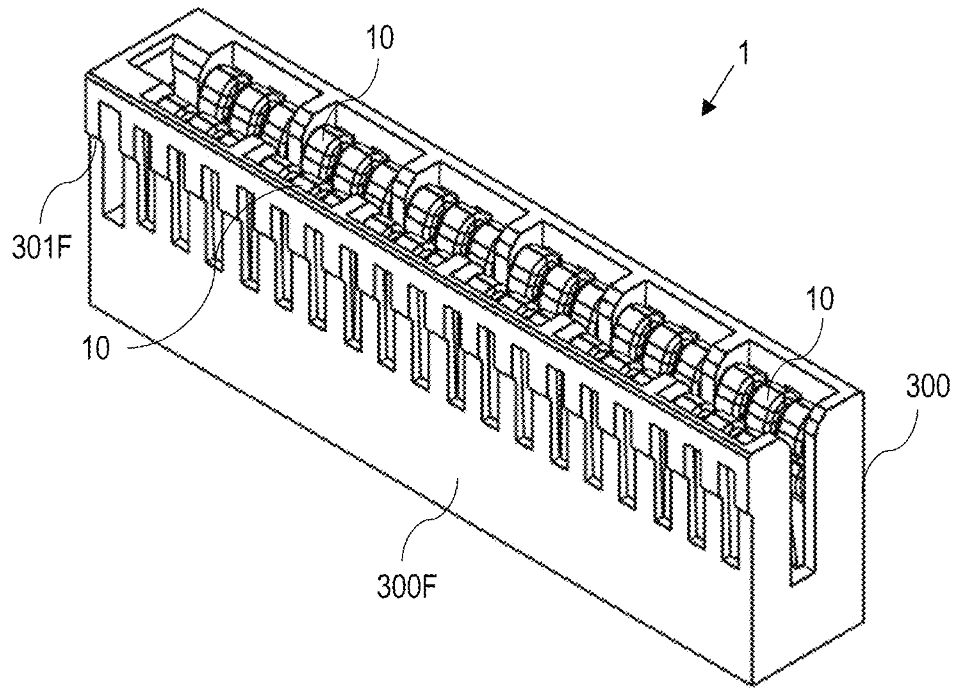
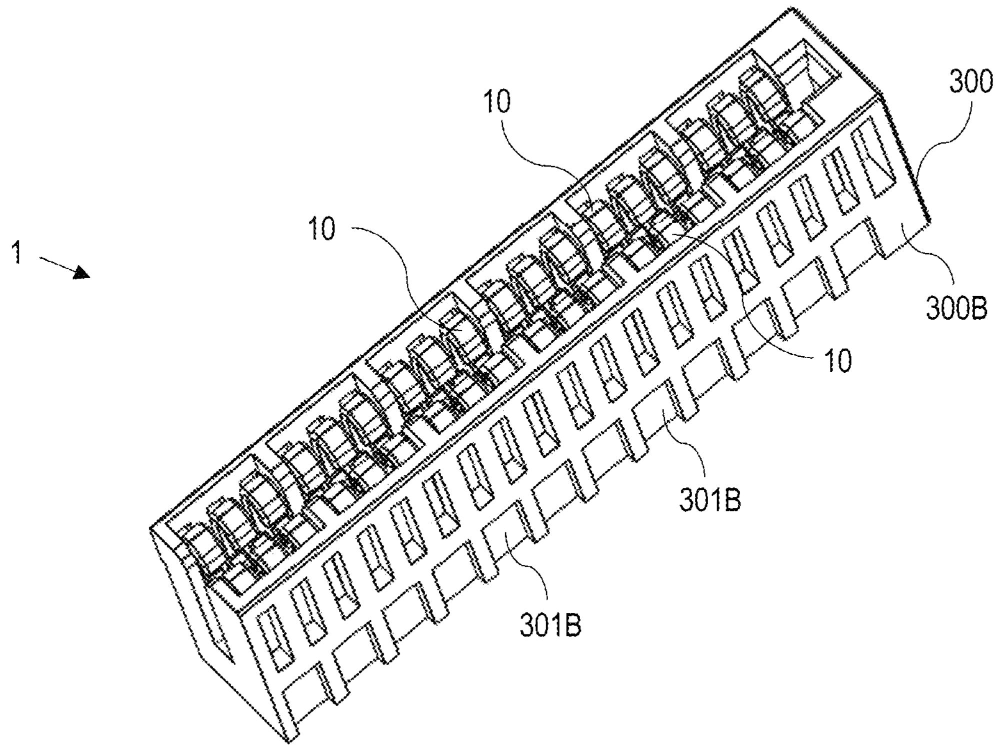
FIG. 2B

FIG. 7A
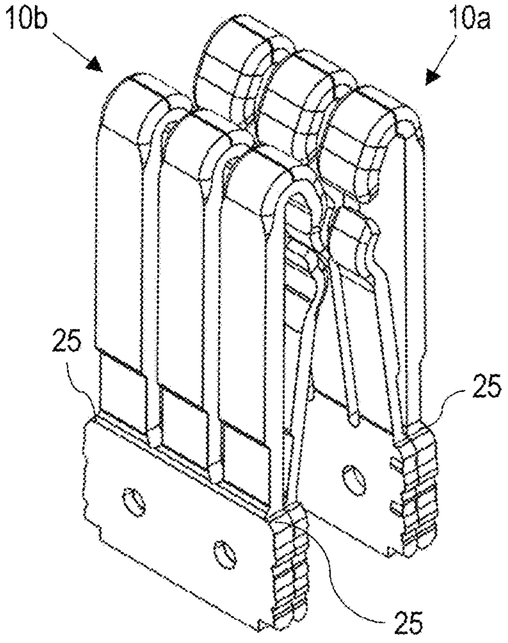
FIG. 7B
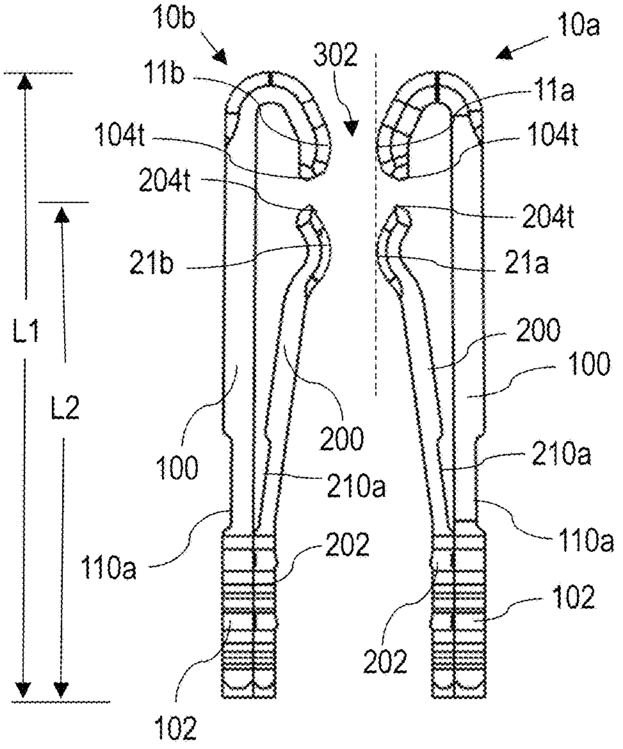
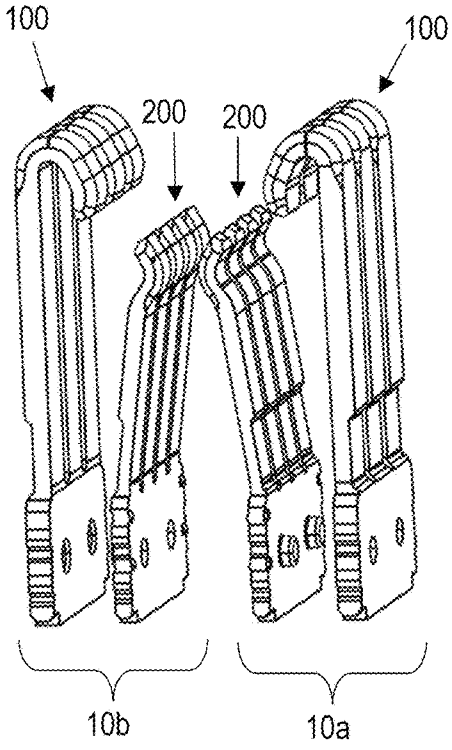
FIG. 7C
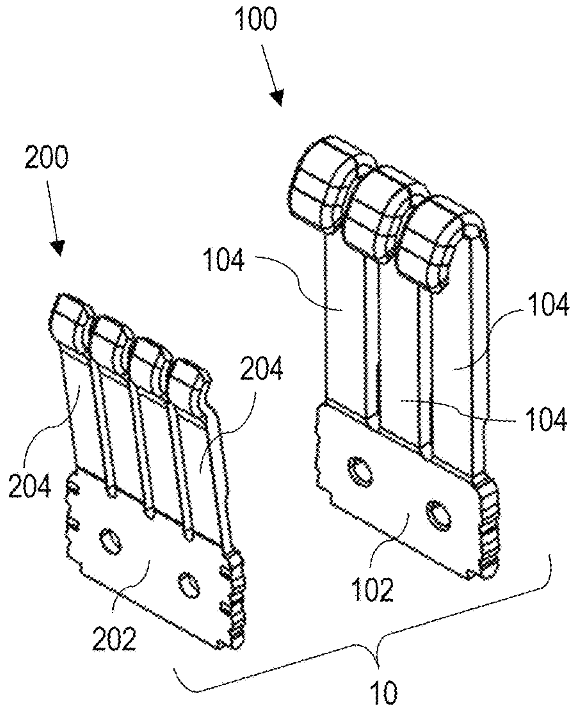
FIG. 7D

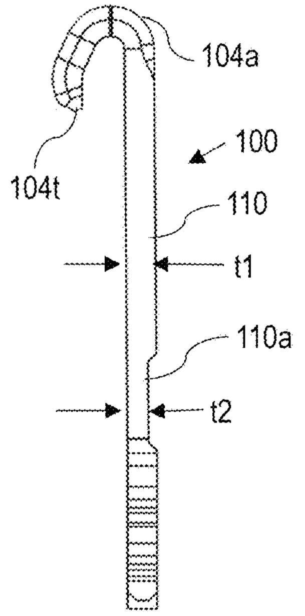
FIG. 8A
FIG. 8D
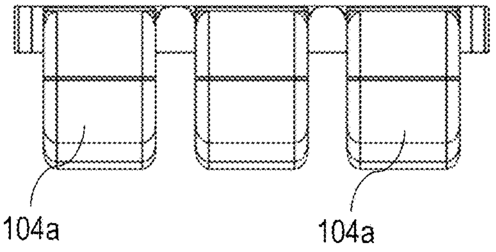
FIG. 8E
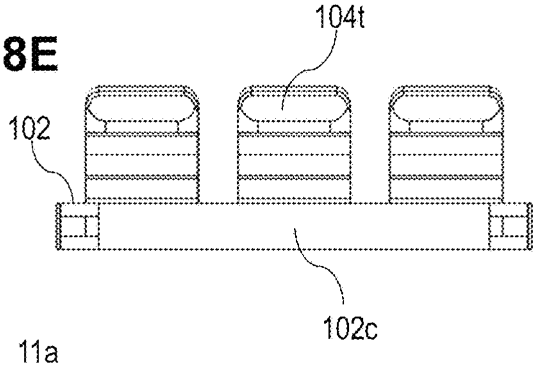
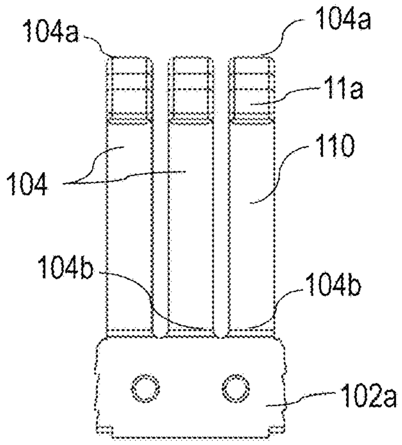
FIG. 8B
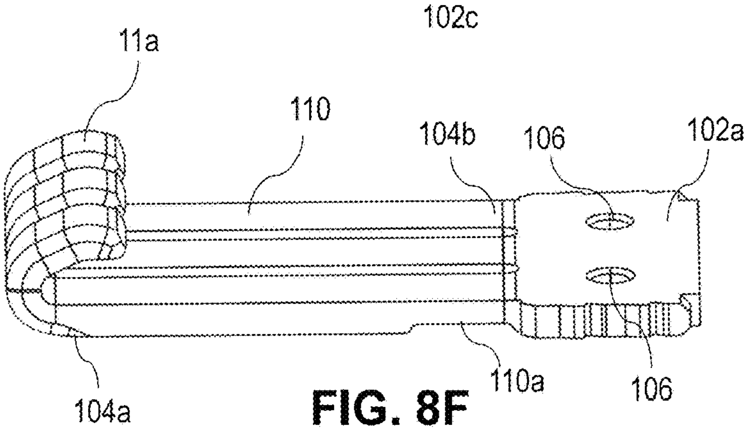
FIG. 8F
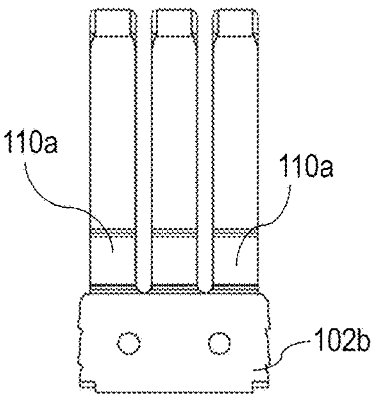
FIG. 8C
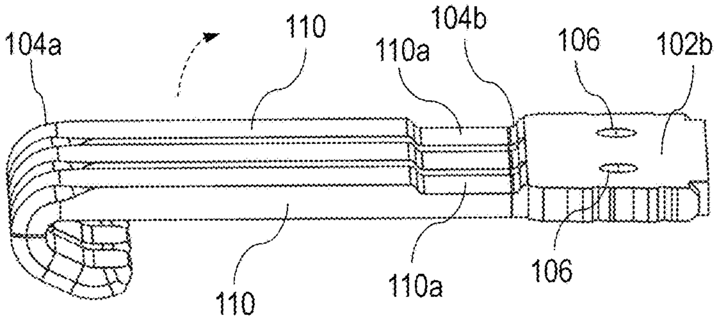
FIG. 8G

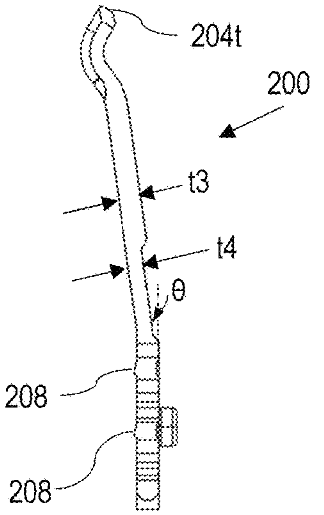
FIG. 9A
FIG. 9D
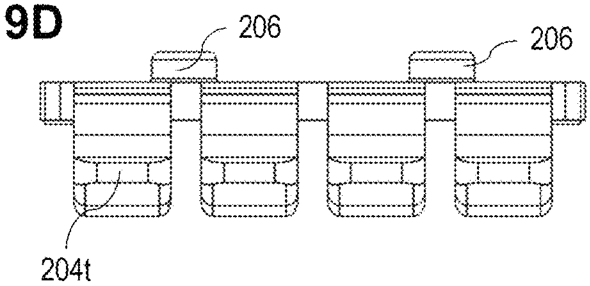
FIG. 9E
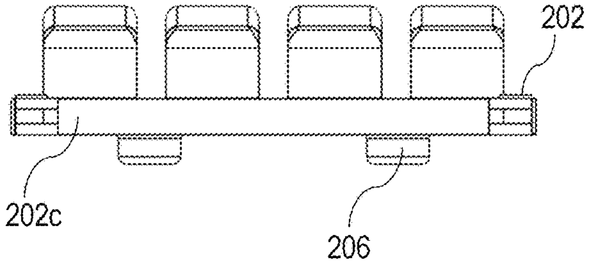
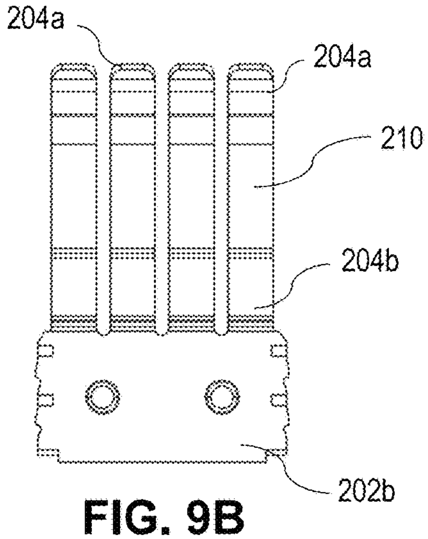
FIG. 9B
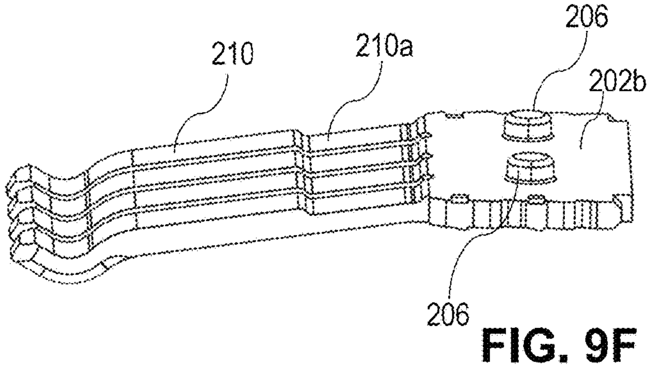
FIG. 9F
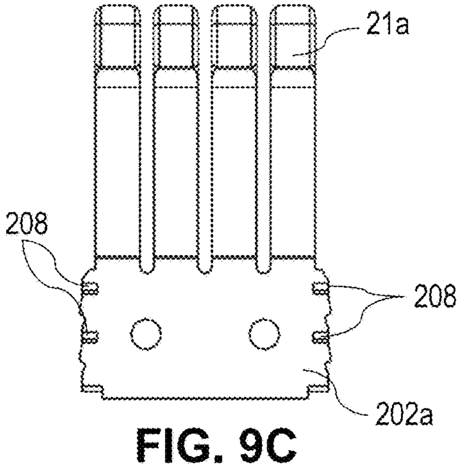
FIG. 9C
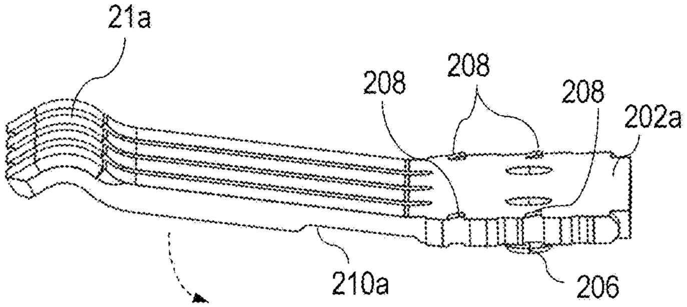
FIG. 9G

TERMINAL FOR ELECTRICAL CONNECTOR, ELECTRICAL CONNECTOR AND METHOD OF MANUFACTURING THE SAME

CROSS REFERENCE TO RELATED APPLICATIONS

This application claims the benefit of priority under 35 U.S.C. § 119(a)-(d) of Patent Application No. 202211334897.2 filed in China on Oct. 28, 2022, and Patent Application No. 202222859336.6 filed in China on Oct. 28, 2022, both of which are incorporated by reference herein in their entireties.

FIELD OF THE DISCLOSURE

The technology disclosed herein relates generally to electrical interconnection systems and more specifically to card-edge-type electrical connectors and terminals therefor useable in high-power applications.

BACKGROUND

Electrical connectors are used in many electrical systems. Electronic devices have been provided with assorted types of connectors whose primary purpose is to enable data, commands, power and/or other signals to pass between electronic assemblies. A connector that carries power is sometimes called a power connector. It is generally easier and more cost effective to manufacture an electrical system as separate electronic assemblies that may be joined with electrical connectors. For example, one type of electronic assembly is a printed circuit board ("PCB"), which may be a card supporting at least one electrical component (e.g., wiring and/or one or more contact pads and/or electrical circuits, etc.). The terms "card" and "PCB" may be used interchangeably herein. The terms "edge connector" and "card-edge connector" may be used interchangeably herein.

In some scenarios, a two-piece connector is used to join two electronic assemblies. One connector may be mounted to each of the assemblies. The connectors may be mated, forming connections between the two assemblies.

In some other scenarios, a PCB may be joined directly to an electronic assembly via a one-piece electrical connector, which may be configured as a card-edge connector. The PCB may have conductive power pads along an edge that is designed to be inserted into the electrical connector, which may be attached to the electronic assembly. Conductive contacts within the electrical connector may contact the power pads of the PCB, thus electrically connecting the PCB to the electronic assembly. Card-edge-type connectors may mate with components other than a PCB, such as bar-type components that similarly have conductive outer surfaces (e.g., a bus bar and the like). The electrical connector may enable electrical power (e.g., electrical current and/or voltage) to be transferred to and from the PCB (or bus bar or similar component) and the electronic assembly.

SUMMARY

Structures of electrical connectors and connector terminals able to carry electrical power are of great importance to electrical systems that may require high-power operation and/or a small size. Miniaturization may present manufacturing challenges, as smaller sizes may be more difficult to handle due an increased difficulty in grasping and properly orienting a miniature component, which may have dimensions on the order of 1 cm or smaller, and may even have dimensions on the order of 1 mm or smaller. Therefore, a reduction in the number of components in an electrical connector and/or or a reduction in the number of manufacturing steps to produce an electrical connector may be advantageous.

According to an aspect of the present technology, a terminal for use in an electrical connector is provided. The terminal may comprise: an electrically conductive first finger plate comprising a first joining plate and a plurality of first fingers extending from the first joining plate, the first fingers comprising first ends spaced apart from each other and second ends connected to the first joining plate; and an electrically conductive second finger plate comprising a second joining plate and a plurality of second fingers extending from the second joining plate, the second fingers comprising first ends spaced apart from each other and second ends connected to the second joining plate. The first ends of the first fingers may be spaced apart from the first ends of the second fingers. A total number of the second fingers of the second finger plate may be different from a total number of the first fingers of the first finger late. A plurality of first engagement portions disposed on a first side of the first joining plate may be engaged with a plurality second engagement portions disposed on a second side of the second joining plate such that the first and second joining plates are mated together in a fixed position relative to each other. A plurality of protrusions may extend from a first side of the second joining plate, with the first side of the second joining plate being opposite to the second side of the second joining plate.

In some embodiments of this aspect, for at least some of the first fingers, the first end may be separated from the second end by an elongated first beam comprising a thin skiving section having a thickness less than a thickness of a remainder of the first beam. In some embodiments, the thin skiving section of the first beam may be formed of a recess facing in a same direction as the second side of the first joining plate. In some embodiments, the thin skiving section of the first beam may be located in a section proximate the first joining plate, and the thickness of the thin skiving section of the first beam may be between 25% and 35% less than the thickness of the remainder of the first beam. In some embodiments, for at least some of the second fingers, the first end may be separated from the second end by an elongated second beam comprising a thin skiving section having a thickness less than a thickness of a remainder of the second beam. In some embodiments, the thin skiving section of the second beam may be formed of a recess facing towards the first finger plate. In some embodiments, the thin skiving section of the second beam may be located in a section proximate the second joining plate, and the thickness of the thin skiving section of the second beam may be between 25% and 35% less than the thickness of the remainder of the second beam.

In some embodiments of this aspect, the first engagement portions may comprise recesses in the first joining plate, and the second engagement portions may comprise protrusions extending from the second joining plate and seated in the recesses in the first joining plate.

In some embodiments of this aspect, a length of the first finger plate may be greater than a length of the second finger plate.

In some embodiments of this aspect, for at least some of the first fingers, the first end may comprise a hook and a tip at a distal end of the hook. For at least some of the second fingers, the first end may comprise a tip. Portions of the tips of the first fingers may face towards the tips of the second fingers.

In some embodiments of this aspect, a thickness of the first fingers may be between 25% and 30% greater than a thickness of the second fingers.

In some embodiments of this aspect, for at least some of the first fingers, the first end of the first finger may have a first contact surface configured to contact a first side of a connector card. For at least some of the second fingers, the first end of the second finger may have a second contact surface configured to contact the first side of the connector card. The first contact surface may be different from the second contact surface. In some embodiments, for at least some of the first fingers, an elongate straight first beam may connect the first and second ends of the first finger, and a surface of the first beam may be coplanar with a surface of the first joining plate. In some embodiments, for at least some of the second fingers, an elongate second beam connects the first and second ends of the second finger, and the second beam and the second joining plate are not parallel to each other.

In some embodiments of this aspect, the first and second finger plates may be configured to be held together in a insulative housing of the connector without an adhesive and without being fused together by a joining technique. In some embodiments, the protrusions extending from the first side of the second joining plate may be configured to abut against at least one surface of the housing. In some embodiments, the first joining plate may comprise shoulder portions configured to limit an insertion distance of the first and second joining plates in the housing. In some embodiments, the second joining plate may comprise shoulder portions configured to limit an insertion distance of the first and second joining plates in the housing.

In some embodiments of this aspect, the electrical connector may further comprise an insulative housing comprising a terminal compartment in which the first and second finger plates are disposed. The compartment may comprise a slot sized to fit the first and second joining plates therein such that slot endwalls limit an insertion distance of the first and second finger plates into the housing, and such that slot ledges abut the protrusions extending from the first side of the second joining plate. In some embodiments, the housing may comprise a slot wall parallel to the slot ledges, and the slot ledges and the slot wall may exert a compressive force on the first and second joining plates disposed in the slot.

According to another aspect of the present technology, an electrical connector is provided. The electrical connector may comprise: an insulative housing; and a plurality of electrically conductive first terminals disposed in the housing. Each of the first terminals may comprise: an electrically conductive first finger plate comprising a first joining plate and a plurality of first fingers extending from the first joining plate, the first fingers comprising first ends spaced apart from each other and second ends connected to the first joining plate; and an electrically conductive second finger plate comprising a second joining plate and a plurality of second fingers extending from the second joining plate, the second fingers comprising first ends spaced apart from each other and second ends connected to the second joining plate. For each of the first terminals, the first ends of the first fingers may be spaced apart from the first ends of the second fingers, a total number of the second fingers of the second finger plate may be different from a total number of the first fingers of the first finger late, a plurality of first engagement portions disposed on a first side of the first joining plate may be engaged with a plurality second engagement portions disposed on a second side of the second joining plate such that the first and second joining plates are mated together in a fixed position relative to each other, and a plurality of protrusions may extend from a first side of the second joining plate, the first side of the second joining plate being opposite to the second side of the second joining plate. The housing may comprise a plurality of first compartments in which the first terminals are disposed. Each of the first compartments may comprise a first slot sized to fit the first and second joining plates of a corresponding one of the first terminals therein such that: first slot endwalls of the first slot may limit an insertion distance of the first and second finger plates of the first terminal into the first compartment, and first slot ledges of the first slot may abut the protrusions extending from the first side of the second joining plate of the first terminal.

In some embodiments of this aspect, the first and second finger plates of the first terminal may be configured to be held together in the first slot of the first compartment without an adhesive and without being fused together by a joining technique.

In some embodiments of this aspect, the protrusions extending from the first side of the second joining plate of the first terminal may be configured to abut against at least one surface of the housing.

In some embodiments of this aspect, the first joining plate of the first terminal may comprise shoulder portions configured to limit an insertion distance of the first and second joining plates of the first terminal in the housing.

In some embodiments of this aspect, the second joining plate of the first terminal may comprise shoulder portions configured to limit an insertion distance of the first and second joining plates of the first terminal in the housing.

In some embodiments of this aspect, the first slot may comprise a first slot wall parallel to the first slot ledges, and the first slot ledges and the first slot wall may exert a compressive force on the first and second joining plates of the first terminal disposed in the first compartment.

In some embodiments of this aspect, the connector may further comprise a plurality of electrically conductive second terminals disposed in the housing, The second terminals may have a same structure as the first terminals. The housing may comprise a plurality of second compartments in which the second terminals are disposed. Each of the second compartments may comprise a second slot sized to fit first and second joining plates of a corresponding one of the second terminals therein such that: second slot endwalls of the second slot may limit an insertion distance of first and second finger plates of the second terminal into the second compartment, and second slot ledges may abut the protrusions extending from the first side of the second joining plate of the second terminal. In some embodiments, for each of the first terminals: the first ends of the first fingers may have first contact surfaces configured to contact a first side of a card when the card is inserted in the housing, and the first ends of the second fingers may have second contact surfaces configured to contact the first side of the card when the card is inserted in the housing, the first contact surfaces being different from the second contact surfaces. The first and second contact surfaces of the first terminals may form a first side of a card-insertion opening in the housing. In some embodiments, for each of the second terminals, first and second contact surfaces may be configured to contact second side of the card when the card is inserted in the housing, and the first and second contact surfaces of the second terminals may form a second side of the card-insertion opening in the housing. In some embodiments, when a card is not inserted in the card-insertion opening, the first and second contact surfaces of the first terminals may face the first and second contact surfaces of the second terminals. In some embodiment, the first compartments may be arranged in a first row of the housing, the first terminals may be disposed in the first compartments in a first terminal row, the second compartments may be arranged in a second row of the housing, the second terminals may be disposed in the second compartments in a second terminal row, a card-insertion slot may be formed between the first and second terminal rows, and the second finger plates of the first and second terminals may be closer to the card-insertion slot than the first finger plates of the first and second terminals. In some embodiments, the first terminal row may be a mirror image of the second terminal row. In some embodiments, the first and second fingers of the first terminals of the first terminal row may be configured to contact a first side of a card when the card is inserted in the card-insertion opening, and first and second fingers of the second terminals of the second terminal row may be configured to contact a second side of the card when the card is inserted in the card-insertion opening.

According to another aspect of the present technology, a method of manufacturing an electrical connector is provided. The method may comprise: (a) inserting a first end of an electrically conductive first terminal into a first compartment of an insulative housing, the first end of the first terminal comprising a plurality of first fingers and a plurality of second fingers; (b) after the inserting of the first end of the first terminal, inserting first and second joining plates of the first terminal into a first slot of the first compartment; and (c) seating the first and second joining plates of the first terminal in the first slot such that portions of lateral edges of the first and second joining plates of the first terminal abut first slot endwalls and such that opposite surfaces of the first slot prevent the first and second joining plates of the first terminal from separating from each other.

In some embodiments of this aspect, the seating of the first and second joining plates may comprise sliding the first and second joining plates into the first slot such that first slot ledges of the first slot may abut a plurality of protrusions extending from a surface of the joining plates of the first terminal. In some embodiments, after the seating of the first and second joining plates, the first slot ledges and a first slot wall of the housing may exert a compressive force on the first and second joining plates, the first slot wall being parallel to the first slot ledges. In some embodiments, the method may further comprise joining a first finger plate to a second finger plate to form the first terminal. The first finger plate may comprise the first joining plate, and the first fingers may extend from the first joining plate. The second finger plate may comprise the second joining plate, and the second fingers may extend from the second joining plate. In some embodiments, the joining of the first and second finger plates may comprise engaging a plurality of first engagement portions disposed on a first side of the first joining plate with a plurality second engagement portions disposed on a first side of the second joining plate such that the first and second joining plates are in a fixed position relative to each other. The protrusions may be located on a second side of the second joining plate and may abut the first slot ledges of the first slot.

In some embodiments of this aspect, the method may further comprise: (d) inserting a first end of an electrically conductive second terminal into a second compartment of the housing, the first end of the second terminal comprising a plurality of first fingers and a plurality of second fingers; (e) after the inserting of the first end of the second terminal, inserting first and second joining plates of the second terminal into a second slot of the second compartment; and (f) seating the first and second joining plates of the second terminal in the second slot such that portions of lateral edges of the first and second joining plates of the second terminal abut second slot endwalls and such that opposite surfaces of the second slot prevent the first and second joining plates of the second terminal from separating from each other. In some embodiments, the method may further comprise: performing (a), (b), and (c) a plurality of times for a plurality of electrically conductive first terminals to produce a first row of terminals disposed in a first row of compartments; and performing (d), (e), and (f) a plurality of times for a plurality of electrically conductive second terminals to produce a second row of terminals disposed in a second row of compartments. The first row of terminals may be parallel to second row of terminals such that a card-insertion opening may be formed between contact surfaces of the first row of terminals and contact surfaces of the second terminal row of terminals.

Features described herein may be used, separately or together in any combination, in any of the embodiments discussed herein. For example, a feature described for an embodiment may be incorporated in another embodiment even though the feature may not be explicitly described for the other embodiment.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

FIG. 2A shows a top front perspective view of the edge connector of FIG. 1, according to some embodiments of the present technology.

FIG. 2B shows a top rear perspective view of the edge connector of FIG. 1, according to some embodiments of the present technology.

FIG. 7A shows a perspective view of a pair of terminals arranged to contact opposites sides of a PCB (not shown), according to some embodiments of the present technology.

FIG. 7B shows a left-side (or right-side) elevational view of the pair of terminals of FIG. 7A, according to some embodiments of the present technology.

FIG. 7C shows a perspective view of the pair of terminals of FIG. 7A in a disassembled state, according to some embodiments of the present technology.

FIG. 7D shows a perspective view of a terminal of the pair of terminals of FIG. 7A in a disassembled state, according to some embodiments of the present technology.

FIG. 8A shows a right-side elevational view of a first finger plate of the terminal of FIG. 7D, according to some embodiments of the present technology.

FIG. 8B shows an elevational view of an internal or joining side of the first finger plate of the terminal of FIG. 8A, according to some embodiments of the present technology.

FIG. 8C shows an elevational view of an external side of the first finger plate of the terminal of FIG. 8A, according to some embodiments of the present technology.

FIG. 8D shows a top plan view of the first finger plate of the terminal of FIG. 8A, according to some embodiments of the present technology.

FIG. 8E shows a bottom plan view of the first finger plate of the terminal of FIG. 8A, according to some embodiments of the present technology.

FIG. 8F shows a left-side perspective view of the joining side of the first finger plate of the terminal of FIG. 8B, according to some embodiments of the present technology.

FIG. 8G shows a right-side perspective view of the external side of the first finger plate of the terminal of FIG. 8C, according to some embodiments of the present technology.

FIG. 9A shows a right-side elevational view of a second finger plate of the terminal of FIG. 7D, according to some embodiments of the present technology.

FIG. 9B shows an elevational view of an internal or joining side of the second finger plate of the terminal of FIG. 9A, according to some embodiments of the present technology.

FIG. 9C shows an elevational view of an external side of the second finger plate of the terminal of FIG. 9A, according to some embodiments of the present technology.

FIG. 9D shows a top plan view of the second finger plate of the terminal of FIG. 9A, according to some embodiments of the present technology.

FIG. 9E shows a bottom plan view of the second finger plate of the terminal of FIG. 9A, according to some embodiments of the present technology.

FIG. 9F shows a right-side perspective view of the joining side of the second finger plate of the terminal of FIG. 9B, according to some embodiments of the present technology.

FIG. 9G shows a left-side perspective view of the external side of the second finger plate of the terminal of FIG. 9C, according to some embodiments of the present technology.

DETAILED DESCRIPTION

The inventors have recognized and appreciated designs for interconnection of electronic assemblies to enable compact, less expensive, and more easily assembled electronic systems. Such systems require power to be delivered to or from assemblies in relatively small spaces. These designs include adaptations to card-edge connectors that support large power flow through small spaces without undesired effects (e.g., without a large increase in heat generation) and that are relatively simple to manufacture compared with some conventional edge connectors. In some embodiments of the present technology, electrically conductive terminals may be configured to be assembled with fewer components and fewer manufacturing steps than conventional terminals used in conventional edge connectors. In some embodiments, the terminals may have a flexible configuration that may allow for manufacturing modifications to be easily adopted, as discussed below. In some embodiments, an edge connector may incorporate the terminals without requiring gluing or welding or fusing or other bonding techniques to be used to keep the terminals in place in the edge connector. In some embodiments, an edge connector may comprise at least one pair of conductive terminals configured to contact both sides of a PCB (or like structure, such as a bus bar) simultaneously. In some embodiments, the terminals of the pair may be structured to be mounted in an insulative housing of the edge connector by insertion of the terminal into corresponding compartments of the housing. Each of the terminals may be retained in its corresponding compartment by a friction fit of protrusions on the terminal against one or more surfaces of the compartment. In some embodiments, the friction fit may be sufficient to retain the terminal in the compartment without requiring further bonding, although additional bonding may be employed as an option, and without requiring a retaining device to prevent the terminal from dislodging from the compartment, although a retaining object may be employed as an option. That is, without the need for gluing, or brazing, or spot welding or another type of welding, or soldering, or another joining technique to be performed, the pair of terminals may remain in place in their corresponding compartments of the housing by friction alone. Similarly, the pair of terminals may remain in place in their corresponding compartments without the use of molded plastic, or clips, or pins, or retainers of other types. Joining techniques and/or retaining objects may be used optionally.

Figure 1:
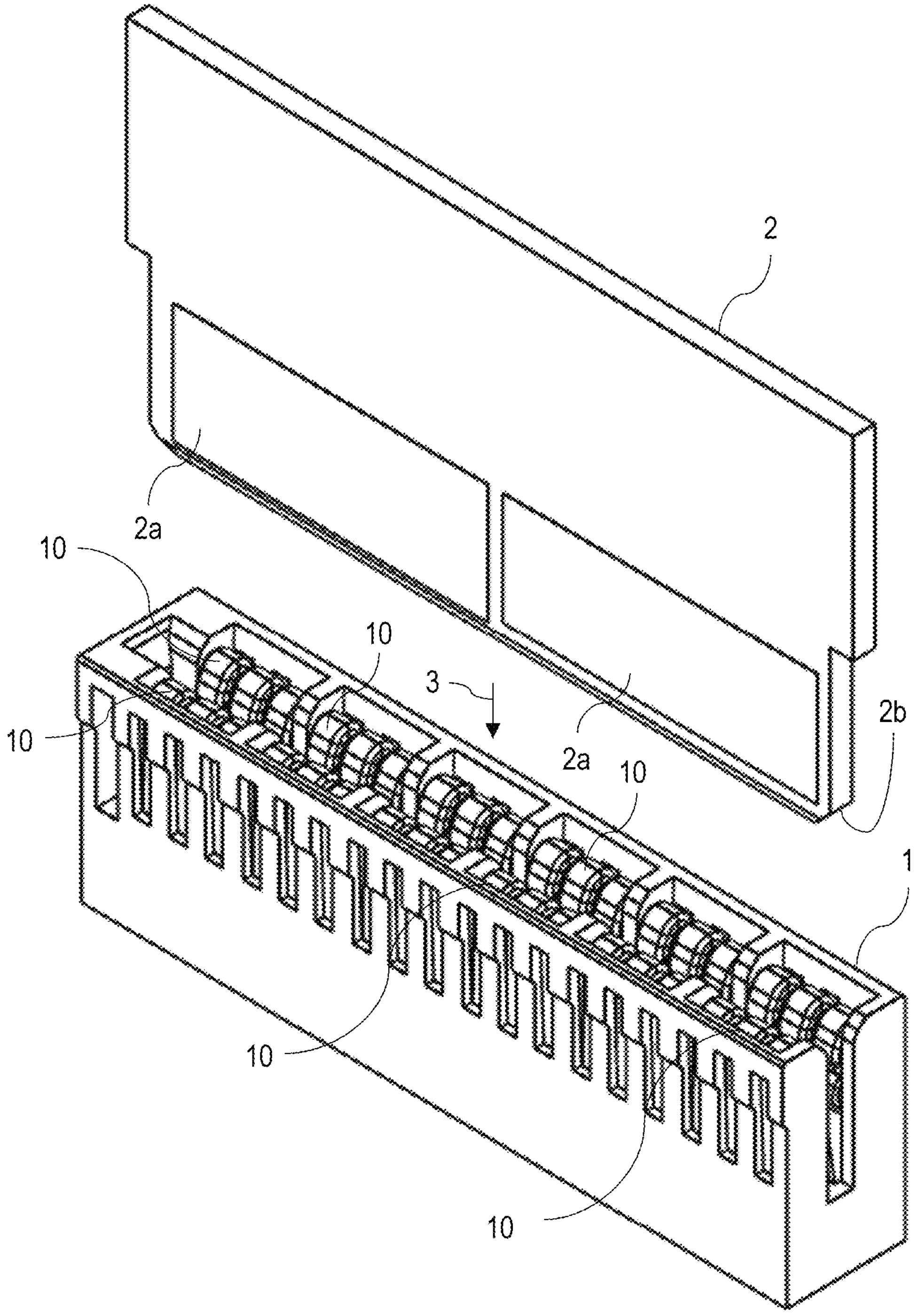
FIG. 1 shows a PCB and an edge connector configured to connect to the PCB, according to some embodiments of the present technology.

FIG. 1 shows a card-edge connector 1 and a PCB 2 positioned to be inserted in the connector 1, according to some embodiments of the present technology. An arrow 3 indicates an insertion direction of the PCB 2 into the connector 1. The PCB 2 may comprise one or more electrically conductive contact pads 2*a* positioned on at least one surface of the PCB 2 at or near an insertion edge 2*b* of the PCB 2. Although FIG. 1 shows two contact pads 2*a* on a single side of the PCB 2, it should be understood that one or more additional contact pads may be present on an opposite side of the PCB 2 not shown in FIG. 1. According to some embodiments, the contact pads 2*a* may be configured to transfer power to the connector 1 from electrical wiring (not shown) of the PCB 2 and/or may be configured to transfer power from the connector 1 to other electronic components via electrical wiring (not shown) of the PCB 2. For example, the PCB 2 may comprise power planes in which conductive traces or wiring may be present for routing electrical current and/or voltage to components of an electronic system in which the connector 1 and the PCB 2 are deployed. The components attached to the PCB 2 may consume power that is delivered to the contact pads 2*a* of the PCB 2 through electrically conductive power terminals 10 of the connector 1 in contact with the contact pads 2*a*. In another example, the components attached to the contact pads 2*a* of the PCB 2 may condition or otherwise deliver power through the contact pads 2*a* to the terminals 10 of the connector 1, where the power can then be routed to other components in an electronic system connected to the terminals 10. Regardless of the direction in which power is flowing, onto or off of the PCB 2 through the connector 1, techniques as described herein may be applied to the connector 1 to enable the terminals 10 to be robust for repeated insertions of the PCB 2 (or of other cards) and/or to enable the connector 1 to be assembled with the terminals 10 therein more easily than in conventional manufacturing techniques.

Although the techniques of the present technology disclosed herein may refer to the transfer of power between the PCB 2 and the connector 1, it should be understood that the disclosed techniques are not limited to conduction of power but may, in some embodiments, be used for signal communication. For example, the contact pads 2*a* of the PCB 2 may comprise signal pads configured to transfer electrical signals to and/or from the terminals 10 of the connector 1.

Figure 2C:
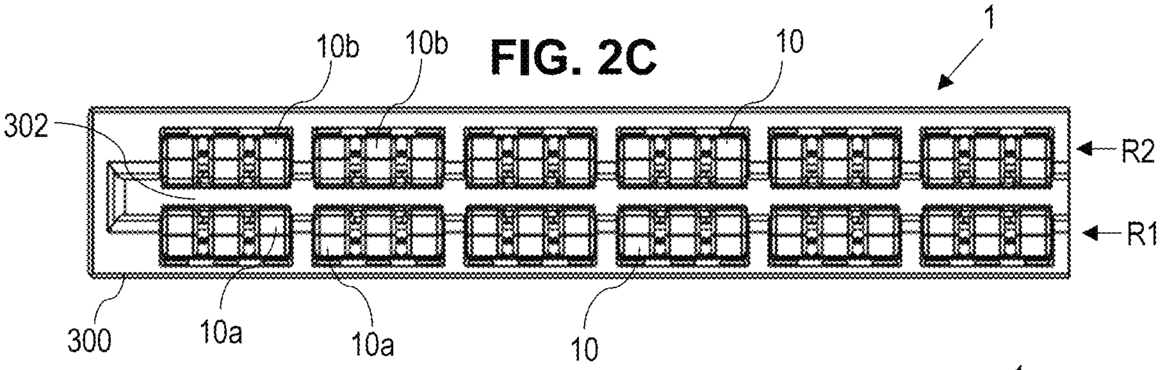
FIG. 2C shows a top plan view of the edge connector of FIG. 1, according to some embodiments of the present technology.
Figure 2D:
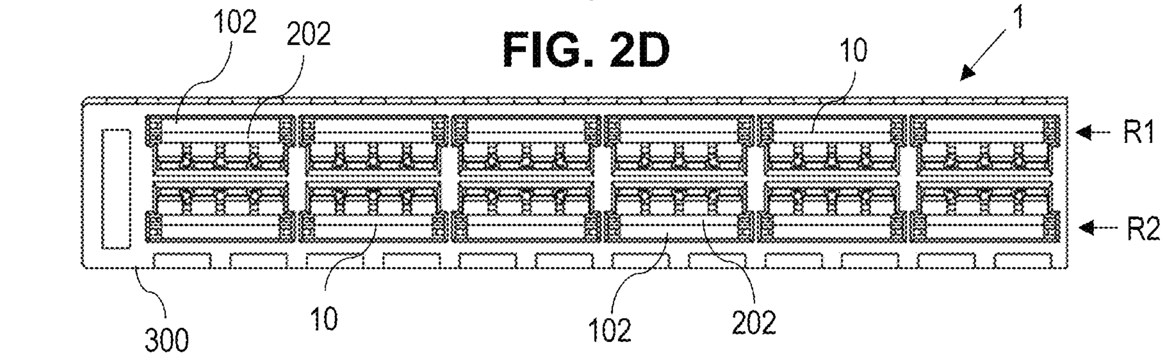
FIG. 2D shows a bottom plan view of the edge connector of FIG. 1, according to some embodiments of the present technology.
Figure 2E:
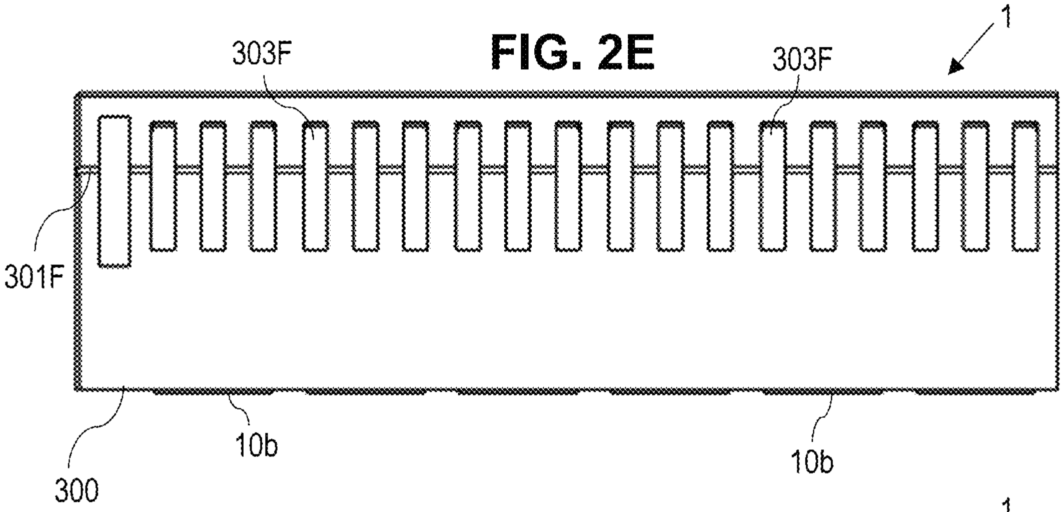
FIG. 2E shows front-side elevational view of the edge connector of FIG. 1, according to some embodiments of the present technology.
Figure 2F:
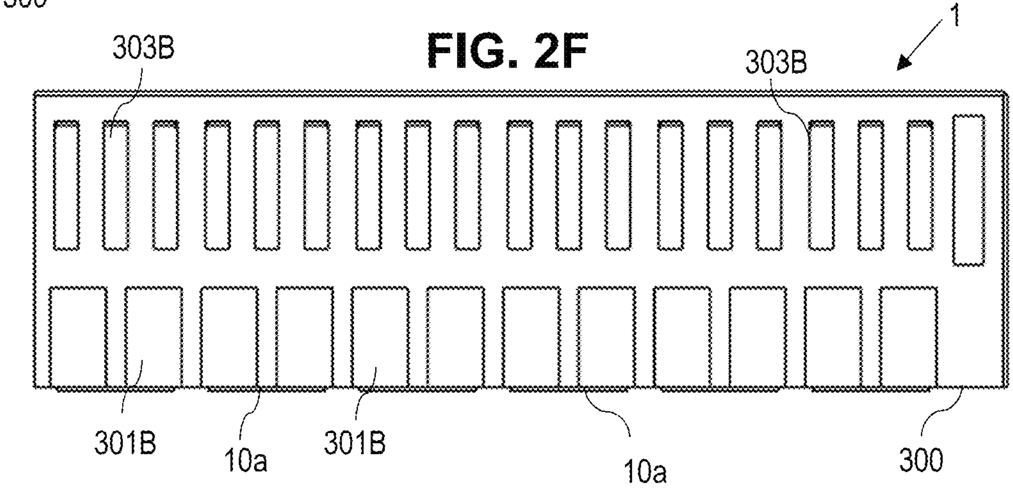
FIG. 2F shows a rear-side elevational view of the edge connector of FIG. 1, according to some embodiments of the present technology.
Figure 2G:
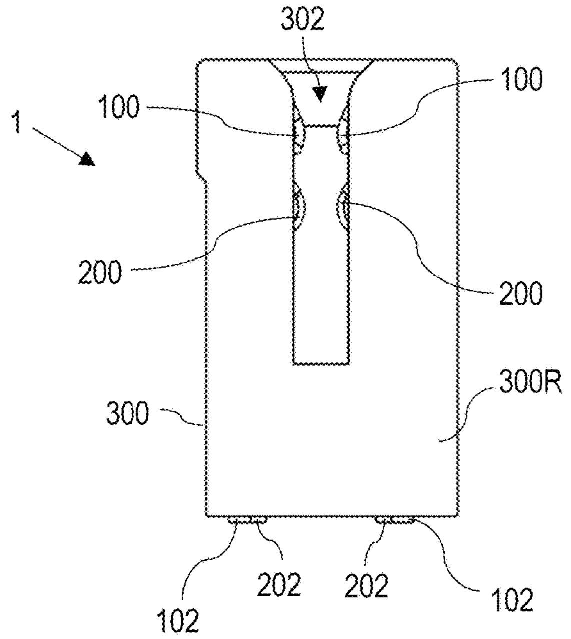
FIG. 2G shows a right-side elevational view of the edge connector of FIG. 1, according to some embodiments of the present technology.
Figure 2H:
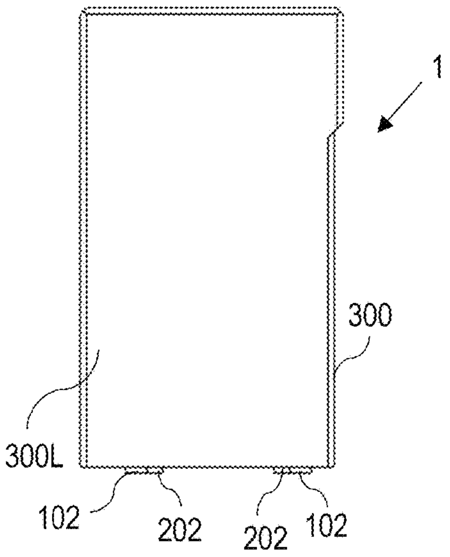
FIG. 2H shows a left-side elevational view of the edge connector of FIG. 1, according to some embodiments of the present technology.

FIGS. 2A through 2H show different views of the connector 1, according to some embodiments of the present technology. In particular, FIG. 2A shows a top front perspective view; FIG. 2B shows a top rear perspective view; FIG. 2C shows a top plan view; FIG. 2D shows a bottom plan view; FIG. 2E shows front-side elevational view; FIG. 2F shows a rear-side elevational view; FIG. 2G shows a right-side elevational view; and FIG. 2H shows a left-side elevational view. The terminals 10 of the connector 1 may be arranged in a first row R1 and a second row R2 such that a slot or card-insertion opening 302 is between the rows R1, R2. In some embodiments, the terminals 10 may be disposed in an insulative housing 300 and may comprise one or more pairs 10*a*, 10*b* in the housing 300, with a first terminal 10*a* of each pair being in the first row R1 and with a second terminal 10*b* of each pair being in the second row R2. In some embodiments, the first terminal 10*a* may be identical in structure to the second terminal 10*b* and may be arranged such that contact surfaces 11*a*, 21*a* of the first terminal 10*a* face contact surfaces 11*b*, 21*b* of the second terminal 10*b* across the card-insertion opening 302 (see FIG. 7B).

According to some embodiments of the present technology, a user may readily know an orientation of the connector 1 by noticing an asymmetry in the connector 1. In some embodiments, when seen from a top view (e.g., FIGS. 2A, 2C), the card-insertion opening 302 may be bounded on a left side by a left wall 300L of the housing 300 (see FIG. 2H) but may not be bounded on a right side but instead may extend through a right wall 300R of the housing 300 (see FIG. 2G). In some embodiments, a front wall 300F of the housing 300 may have a surface ledge 301F on an external surface of the front wall 300F, which may extend partially or completely from the left wall 300L to the right wall 300R of the housing 300. In some embodiments, a back or rear wall 300B of the housing 300 may have one or more surface recesses 301B on an external surface of the rear wall 300B. In some embodiments, the front wall 300F may comprise at least one through-hole 303F, which may facilitate dissipation of heat generated at the first row R1 of terminals 10 (10*a*). In some embodiments, the rear wall 300B may comprise at least one through-hole 303B, which may facilitate dissipation of heat generated at the second row R2 of terminals 10 (10*b*).

Figure 3A:
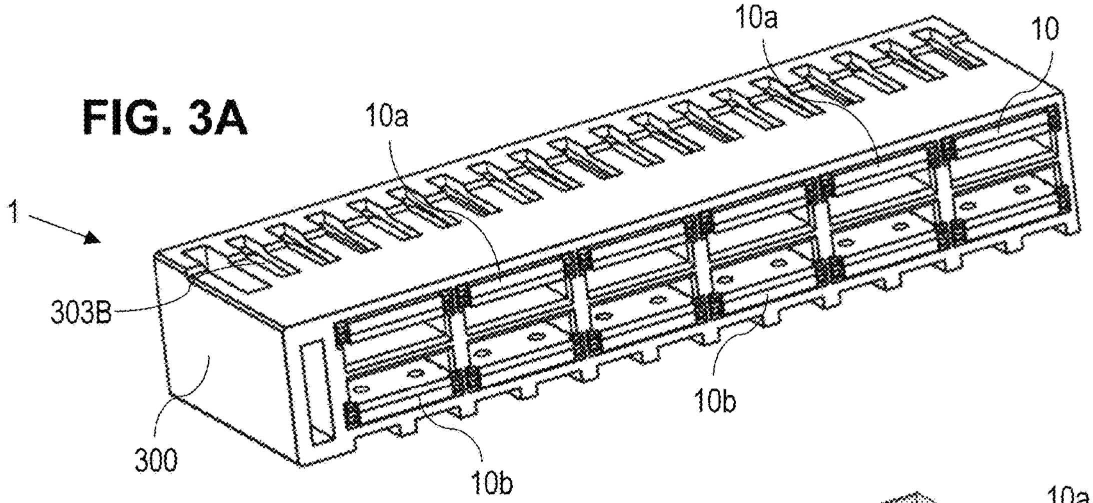
FIG. 3A shows a bottom front perspective view of the edge connector of FIG. 1, according to some embodiments of the present technology.
Figure 3B:
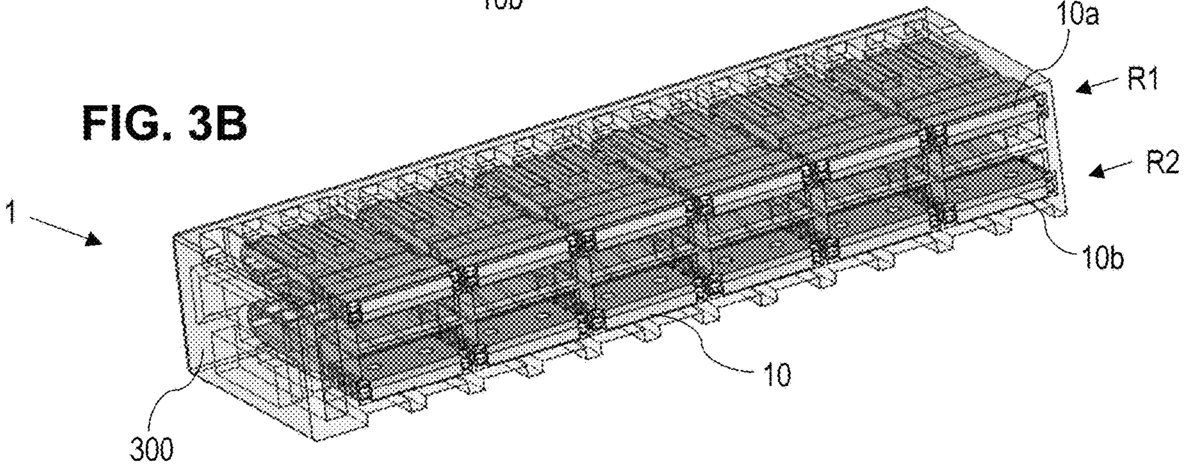
FIG. 3B shows the same view as FIG. 3A, with a housing of the edge connector appearing translucent so that terminals within the housing are visible, according to some embodiments of the present technology.

FIG. 3A shows a bottom front perspective view of the connector 1, and FIG. 3B shows the same view with the housing 300 appearing translucent so that the terminals 10 (10*a*, 10*b*) within the housing 300 are visible, according to some embodiments of the present technology. In some embodiments, the terminals 10*a* of the first row R1 may be aligned with the terminals 10*b* of the second row R2 such that the terminals 10 of the connector 1 may be considered to have pairs 10*a*, 10*b* of terminals, which each pair being configured to sandwich a PCB in between when the PCB is inserted in the card-insertion opening 302.

Figure 4A:
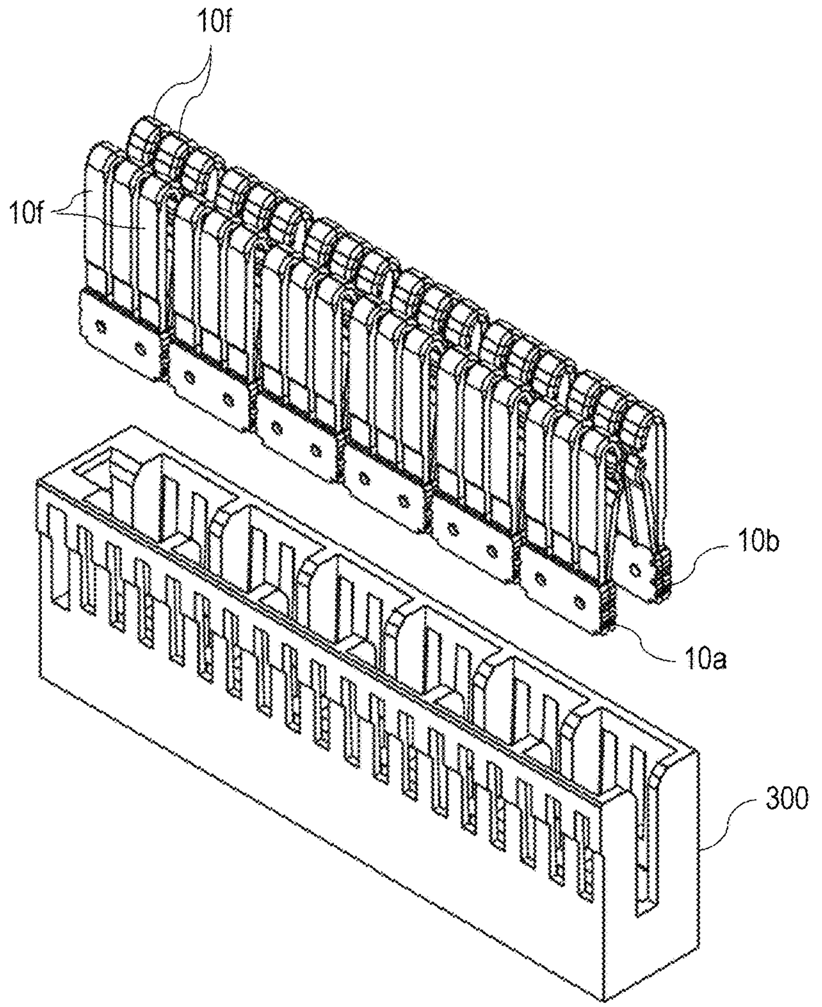
FIG. 4A shows a top front perspective view of the edge connector of FIG. 1 in a partially disassembled state, according to some embodiments of the present technology.
Figure 4B:
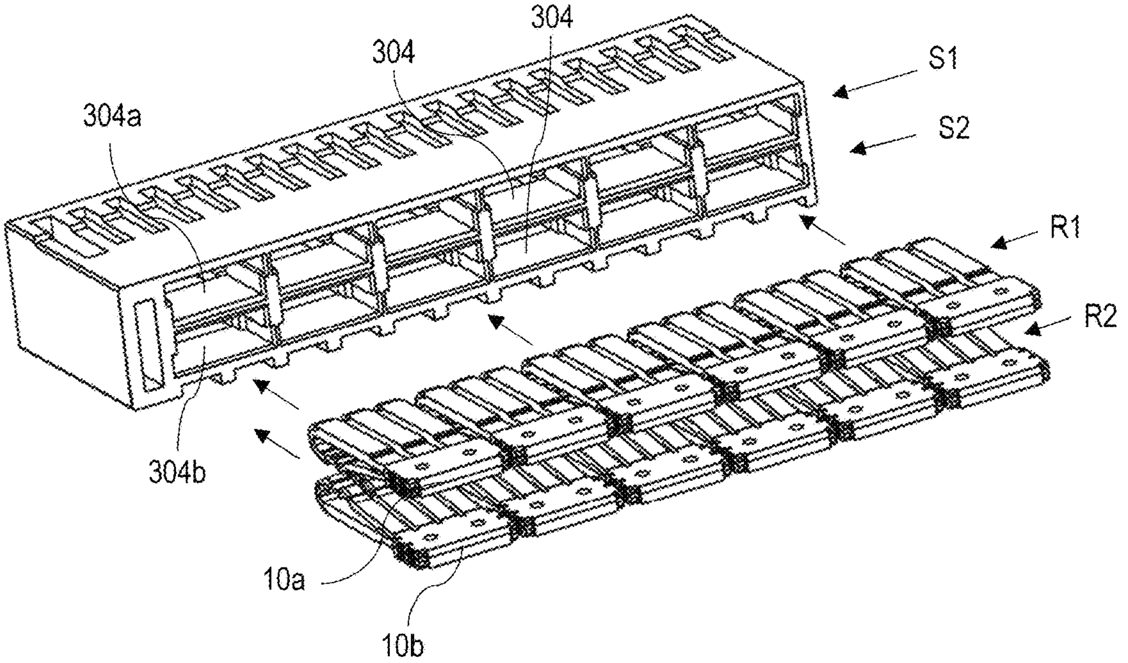
FIG. 4B shows a bottom front perspective view of the edge connector of FIG. 1 in a partially disassembled state, according to some embodiments of the present technology.
Figure 5A:
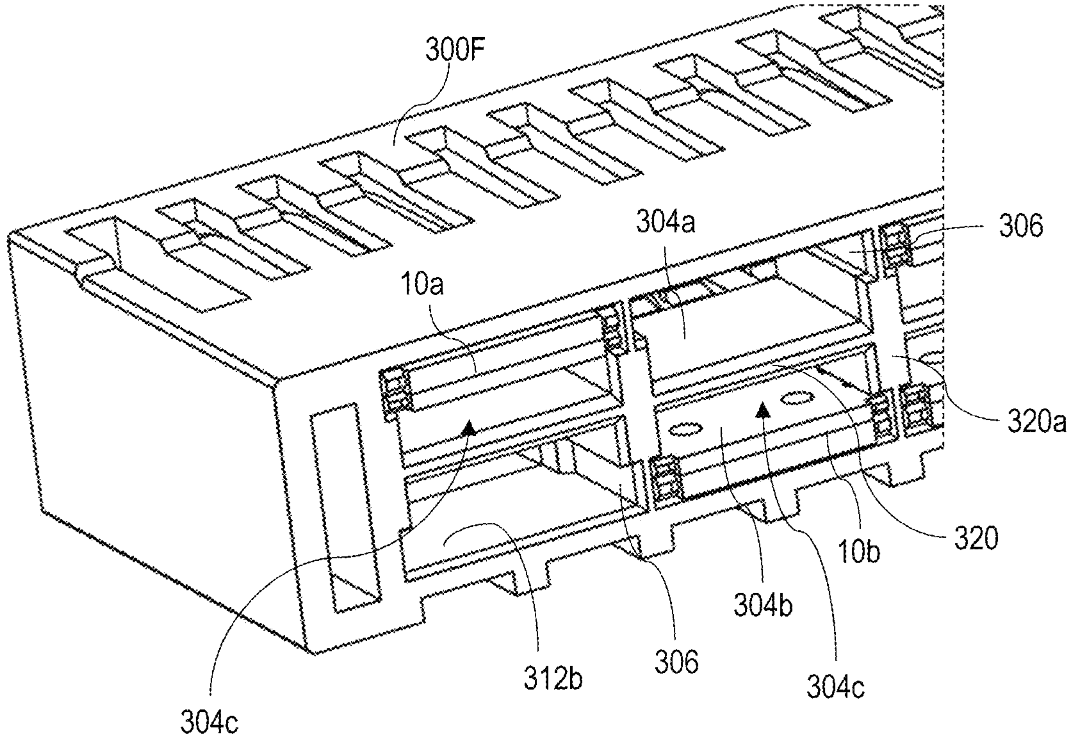
FIG. 5A shows a portion of the same view as FIG. 3A, with some of the terminals removed so that an internal structure of the housing is visible, according to some embodiments of the present technology.
Figure 5B:
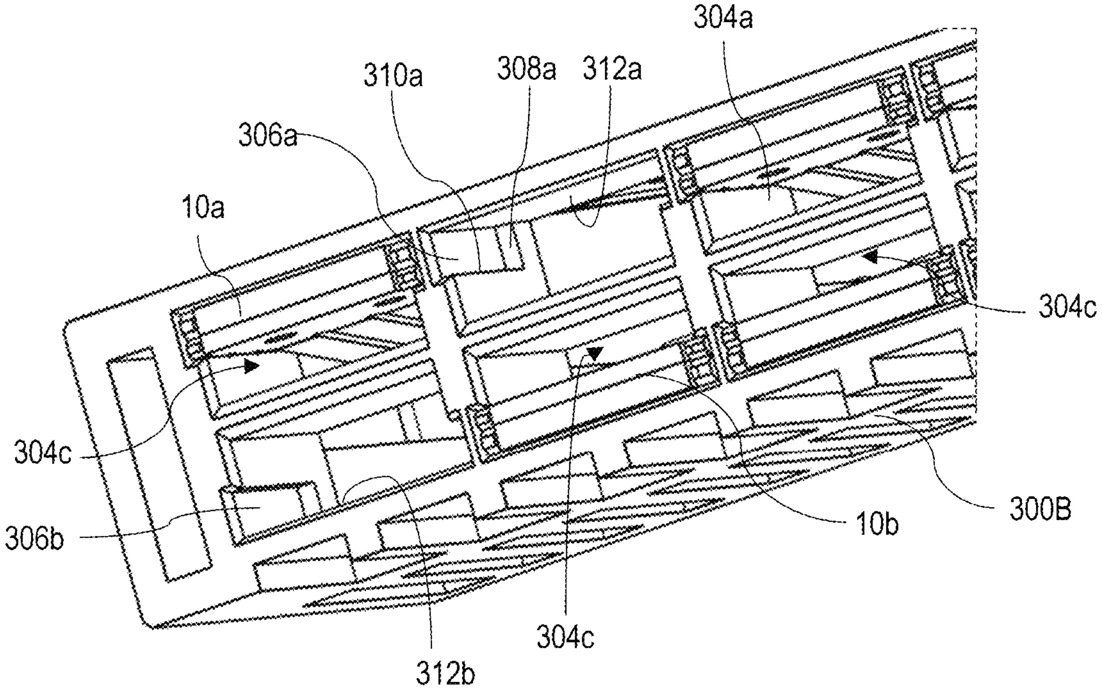
FIG. 5B shows a bottom rear perspective view of a portion of the edge connector of FIG. 1, with some of the terminals removed so that an internal structure of the housing is visible, according to some embodiments of the present technology.
Figure 6A:
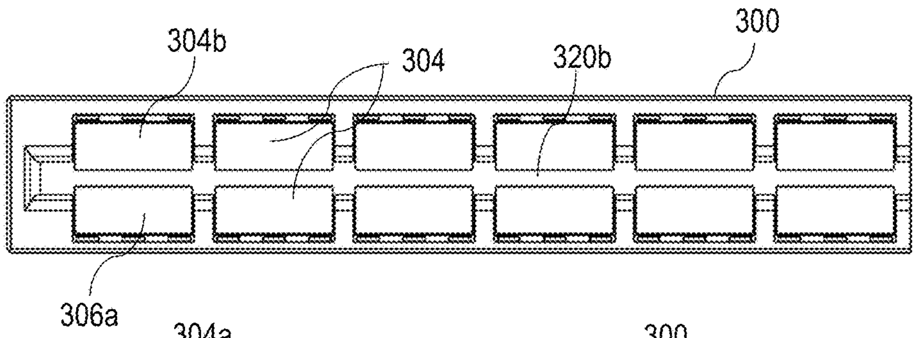
FIG. 6A shows a top plan view of the housing of FIG. 3B, according to some embodiments of the present technology.
Figure 6B:
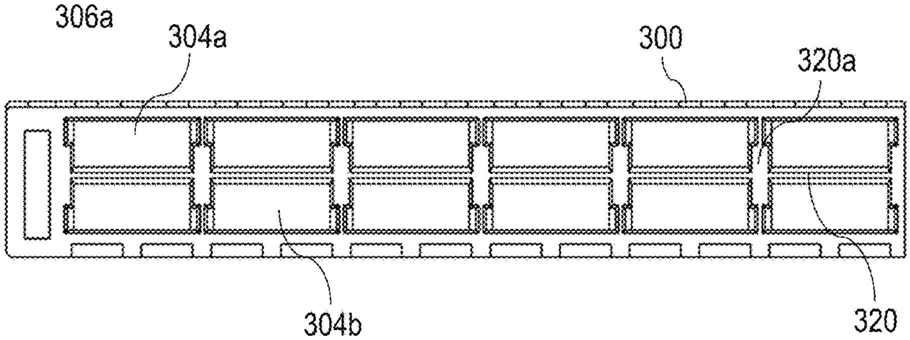
FIG. 6B shows a bottom plan view of the housing of FIG. 3B, according to some embodiments of the present technology.
Figure 6C:
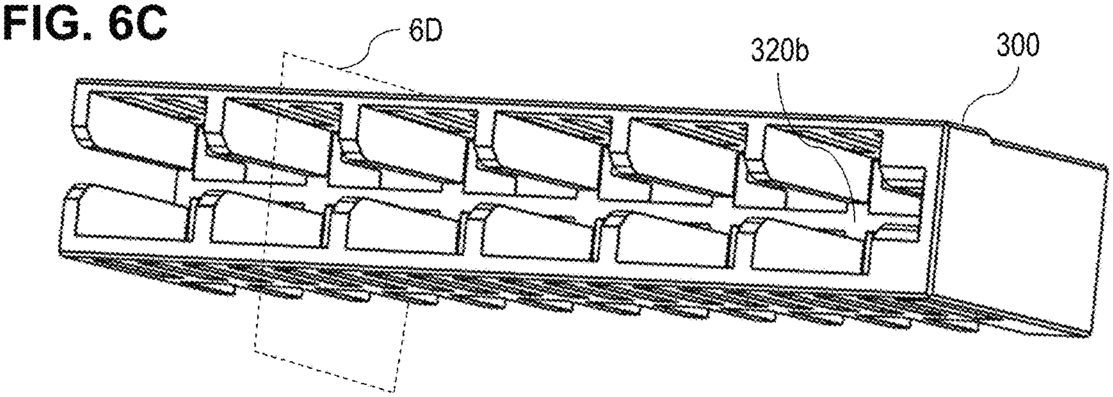
FIG. 6C shows a top rear perspective view of the housing of FIG. 3B, according to some embodiments of the present technology.
Figure 6D:
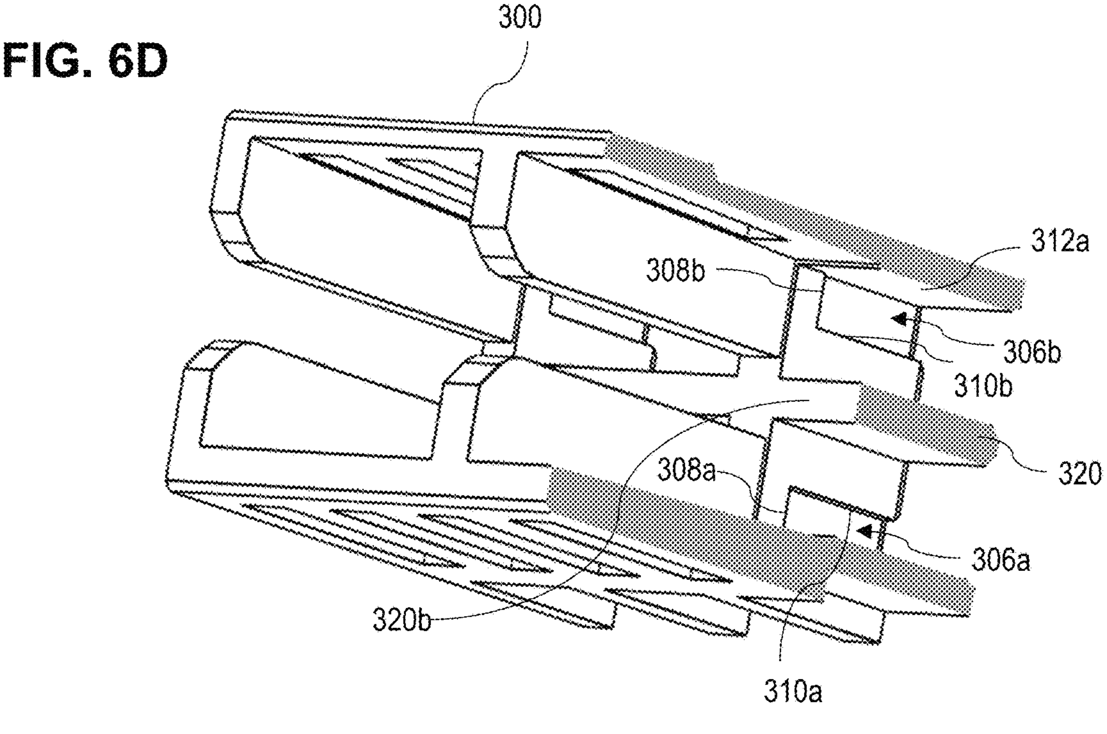
FIG. 6D shows a section of the view of FIG. 6C cut along a plane 6D, according to some embodiments of the present technology.

FIGS. 4A and 4B show a top front perspective view and a bottom front perspective view, respectively, of the connector 1 in a partially disassembled state, according to some embodiments of the present technology. FIGS. 5A and 5B show a bottom front perspective view and a bottom rear perspective view, respectively, of a portion near the left wall 300L of the connector 1, according to some embodiments of the present technology. In FIGS. 5A and 5B, some of the terminals 10 have been removed so that an internal structure of the housing 300 may be visible. FIGS. 6A to 6C show a top plan view, a bottom plan view, and a top rear perspective view, respectively, of the housing 300, according to some embodiments of the present technology. FIG. 6D shows a section of the view of FIG. 6C cut along a plane 6D. In some embodiments, the housing 300 may comprise a plurality of terminal compartments 304 in which the terminals 10 may be disposed. In some embodiments, the terminal compartments 304 may comprise a first row S1 of compartments 304*a* in which the first terminals 10*a* may be disposed, and may comprise a second row S2 of compartments 304*b* in which the second terminals 10*b* may be disposed. In some embodiments, the compartments 304 of the housing 300 may be delimited by a separation wall 320 that separates the first terminals 10*a* in the first row R1 from the second terminals 10*b* in the second row R2. In some embodiments, the separation wall 320 may comprise lateral portions 320*a* separating the terminals 10*a* from each other in the first row R1 and/or separating the terminals 10*b* from each other in the second row R2. In some embodiments, an internal edge 320*b* of the separation wall 320 may function as a card-insertion stop that limits an insertion distance of a PCB into the card-insertion opening 302. For example, the internal edge 320*b* of the separation wall 320 may be configured to contact the insertion edge 2*b* of the PCB 2.

Prior to discussing how the terminals 10 may be arranged in the terminal openings 304 (304*a*, 304*b*) of the housing 300 of the connector 1, an understanding of how the terminals 10 (10*a*, 10*b*) may be structured may be beneficial. FIG. 7A shows a perspective view of a pair of terminals 10*a*, 10*b* arranged to contact opposites sides of a PCB (not shown), according to some embodiments of the present technology. In some embodiments, the terminals 10*a*, 10*b* may be identical to each other. FIG. 7B shows a left-side (or right-side) elevational view of the pair of terminals 10*a*, 10*b* of FIG. 7A. As noted above, the terminals 10*a*, 10*b* may be arranged such that the contact surfaces 11*a*, 21*a* of the first terminal 10*a* face the contact surfaces 11*b*, 21*b* of the second terminal 10*b*, with the card-insertion opening 302 being located between the pair of terminals 10*a*, 10*b*. In some embodiments, the terminal 10*a* may comprise at least seven (7) contact surfaces 11*a*, 21*a*. In some embodiments, the terminal 10*a* may comprise a total number of contact surfaces 11*a*, 21*a* in a range of five (5) to nine (9). In some embodiments, the terminal 10*b* may have the same number of contact surfaces as the terminal 10*a*, or may have a different number of contact surfaces.

FIG. 7C shows a perspective view of the pair of terminals 10*a*, 10*b* in a disassembled state, according to some embodiments of the present technology. In some embodiments, the first terminal 10*a* may be identical to the second terminal 10*b*, as noted above, and therefore reference to a terminal 10 may apply to the first terminal 10*a* and/or the second terminal 10*b*. FIG. 7D shows a perspective view of a terminal 10 in a disassembled state, according to some embodiments. The terminal 10 may comprise an electrically conductive first finger plate 100 and an electrically conductive second finger plate 200 mated together at a first joining plate 102 and a second joining plate 202, as depicted in FIG. 7B.

FIGS. 8A to 8G show different views of the first finger plate 100, according to some embodiments of the present technology, of which FIG. 8A shows a right-side elevational view of the first finger plate 100; FIG. 8B shows an elevational view of an internal or joining side of the first finger plate 100; FIG. 8C shows an elevational view of an external side of the first finger plate 100; FIG. 8D shows a top plan view of the first finger plate 100; FIG. 8E shows a bottom plan view of the first finger plate 100; FIG. 8F shows a left-side perspective view of the joining side of the first finger plate 100; and FIG. 8G shows a right-side perspective view of the external side of the first finger plate 100.

FIGS. 9A to 9G show different views of the second finger plate 200, according to some embodiments of the present technology, of which FIG. 9A shows a right-side elevational view of the second finger plate 200; FIG. 9B shows an elevational view of an internal or joining side of the second finger plate 200; FIG. 9C shows an elevational view of an external side of the second finger plate 200; FIG. 9D shows a top plan view of the second finger plate 200; FIG. 9E shows a bottom plan view of the second finger plate 20; FIG. 9F shows a right-side perspective view of the joining side of the second finger plate 200; and FIG. 9G shows a left-side perspective view of the external side of the second finger plate 200.

According to some embodiments of the present technology, a plurality of first fingers 104 may extend from the first joining plate 102 of the first finger plate 100. The first fingers 104 may comprise first ends 104*a* that are spaced apart from each other and may comprise second ends 104*b* that are connected to the first joining plate 102. Similarly, a plurality of second fingers 204 may extend from the second joining plate 202 of the second finger plate 200. The second fingers 204 may comprise first ends 204*a* that are spaced apart from each other, and may comprise second ends 204*b* that are connected to the second joining plate 202. In some embodiments, for at least some of the first and second fingers 104, 204, tips 104*t* of the first ends 104*a* of the first fingers 104 may be spaced apart from tips 204*t* of the first ends 204*a* of the second fingers 204, as depicted in FIG. 7B. In some embodiments, for a first terminal 10*a* of a pair of terminals 10*a*, 10*b*, the contact surfaces 11*a* may be located on the first fingers 104 and the contact surfaces 21*a* may be located on the second fingers 204 such that the contact surfaces 11*a*, 21*a* face in a same direction towards the card-insertion slot 302, to enable the contact surfaces 11*a*, 21*a* to physically contact a PCB inserted in the card-insertion slot 302. Similarly, in some embodiments, for a second terminal 10*b* of a pair of terminals 10*a*, 10*b*, the contact surfaces 11*b* may be located on the first fingers 104 and the contact surfaces 21*b* may be located on the second fingers 204 such that the contact surfaces 11*b*, 21*b* face in a same direction towards the card-insertion slot 302, to enable the contact surfaces 11*b*, 21*b* to be in physical contact with a PCB inserted in the card-insertion slot 302. In some embodiments, the contact surfaces 11*a* may face the contact surfaces 11*b* across the card-insertion slot 302. In some embodiments, the contact surfaces 21*a* may face the contact surfaces 21*b* across the card-insertion slot 302, as depicted in FIG. 7B.

According to some embodiments of the present technology, for at least some of the terminals 10, a total number of the first fingers 104 of the first finger plate 100 may be different from a total number of second fingers 204 of the second finger plate 200. In some embodiments, the total number of the second fingers 204 may be greater than the total number of the first fingers 104. In some embodiments, the first fingers 104 may extend parallel to or be coplanar with the first joining plate 102 except at the first end 104*a*, which may be shaped as a hook, as depicted in FIGS. 8A and 8F. In some embodiments, the second fingers 204 may extend at an angle θ from the second joining plate 202 such that the contact surfaces 11*a*, 21*a* may be aligned on a plane parallel with the first and second joining plates 102, 202, as depicted by the broken line in FIG. 7B. A similar alignment may be present for the contact surfaces 11*b*, 21*b*.

According to some embodiments of the present technology, the first joining plate 102 may comprise a plurality of first engagement portions 106 provided on a first side 102*a* of the first joining plate 102, as depicted in FIG. 8F. In some embodiments, the second joining plate 202 may comprise a plurality of second engagement portions 206 provided on a second side 202*b* of the second joining plate 202, as depicted in FIG. 9F. In some embodiments, the first and second joining plates 102, 202 may be joined together to form the terminal 10 by mating the first engagement portions 106 with the second engagement portions 206 such that the first side 102*a* of the first joining plate 102 faces and contacts the second side 202*b* of the second joining plate 202. For example, the first engagement portions 106 may be recesses 106 and the second engagement portions 206 may be protrusions 206 structured to snugly fit in the recesses 106 such that the first and second joining plates 102, 202 may be in a fixed position relative to each other when the protrusions 206 are seated in the recesses 106. In some embodiments, the recesses 106 may be through-holes in the first joining plate 102. In some embodiments, the first and second joining plates 102, 202 may be held together in a mated configuration by the housing 300, without the use of glue or cement and without requiring any welding or other bonding technique to be performed, as discussed below. In some embodiments, a plurality of protrusions 208 may extend from a first side 202*a* of the second joining plate 202, i.e., on a side opposite to the side where the second engagement portions 206 are located. In some embodiments, the protrusions 208 may be bumps located at one or more edges of the first side 202*a* of the second joining plate 202, as depicted in FIG. 9C. In some embodiments, the protrusions 208 may enable a friction fit of the terminal 10 in the housing 300, such that the terminal 10 may be installed in the housing 300 without the need for glue or a clip or another fastener, and without requiring a bonding technique (e.g., welding, fusing, soldering, etc.) to be used to bond together the first and second joining plates 102, 202 and/or to bond the terminal 10 to the housing 300.

According to some embodiments of the present technology, each of the first fingers 104 of the first finger plate 100 may comprise an elongated first beam 110 separating the first end 104*a* from the second end 104*b*. In some embodiments, some of or all of the first beams 110 may comprise a recess forming a thin skiving section 110*a* of the first beam 110. The thin skiving section 110*a* may having a thickness less than a thickness of a remainder of the first beam 110, as depicted in FIGS. 8F and 8G. The recess forming the thin skiving section 110*a* may be on a same side of the first finger plate 100 as the second side 102*b* of the first joining plate 102 and may face in a direction opposite to the contact surface 11*a*, as depicted in FIG. 8F. In some embodiments, the thin skiving section 110*a* may be present on every one of the first fingers 104 of the first finger plate 100. In some embodiments, the thin skiving section 110*a* may be located near the second end 104*b* in a section proximate the first joining plate 102. For example, the thin skiving section 110*a* may be located adjacent the first joining plate 102, as depicted in FIG. 8G. In some embodiments, the thin skiving section 110*a* may be 20% to 35% thinner than a remainder of the first beam 110. In some embodiments, a thickness t1 of the first beam 110 may be in a range of 0.6 mm to 0.8 mm (e.g., 0.7 mm), and a thickness t2 of the thin skiving section 110*a* may be in a range of 0.4 mm to 0.6 mm (e.g., 0.5 mm). In some embodiments, the first joining plate 102 may have a same thickness as the thickness t1 of the first beam 110.

According to some embodiments of the present technology, each of the second fingers 204 of the second finger plate 200 may comprise an elongated second beam 210 separating the first end 204*a* from the second end 204*b*. In some embodiments, some of or all of the second beams 210 may comprise a recess forming a thin skiving section 210*a* of the second beam 210. The thin skiving section 210*a* may having a thickness less than a thickness of a remainder of the second beam 210, as depicted in FIGS. 9F and 9G. The recess forming the thin skiving section 210*a* may be on a same side of the second finger plate 200 as the second side 202*b* of the second joining plate 202 and may face toward the first finger plate 100. In some embodiments, the thin skiving section 210*a* may be present on every one of the second fingers 204 of the second finger plate 200. In some embodiments, the thin skiving section 210*a* may be located near the second end 204*b* in a section proximate the second joining plate 202. For example, the thin skiving section 210*a* may be located adjacent the second joining plate 202, as depicted in FIG. 9F. In some embodiments, the thin skiving section 210*a* may be 20% to 35% thinner than a remainder of the second beam 210. In some embodiments, a thickness of the second beam 210 may be thinner than the thickness t1 of the first beam 110. In some embodiments, the thickness of the second beam 210 may be in a range of 0.4 mm to 0.6 mm (e.g., 0.5 mm), and a thickness of the thin skiving section 210*a* may be in a range of 0.25 mm to 0.45 mm (e.g., 0.35 mm). In some embodiments, the second joining plate 202 may have a same thickness as the thickness of the second beam 210. As will be appreciated, although the thin skiving sections 110*a*, 210*a* are depicted to be uniformly thinner sections of the beams 110, 210, other types of skiving (e.g., striped recesses, patterned indentations, and the like) may be used.

When the first and second finger plates 100, 200 are joined together, the recess forming the thin skiving section 210*a* of the second beam 210 of the second finger plate 200 may face in a same direction as the recess forming the thin skiving section 110*a* of the first beam 110 of the first finger plate 100, as depicted in FIG. 7B. With such a configuration, during insertion of a PCB in the card-insertion opening 302, the thin skiving section 110*a* may enable the first finger 104 to flex in the direction of the dashed arrow in FIG. 8G and the thin skiving section 210*a* may enable the second finger 204 to flex in the direction of the dashed arrow in FIG. 9G. Such flexing may entail a reduced amount of stress on the first and second joining plates 102, 202 and on the terminal 10 compared with beams having a uniform thickness. The presence of the thin skiving sections 110*a*, 210*a* also may reduce the amount of stress exerted by the terminal 10 on the housing 300 during insertion of a PCB into the card-insertion opening 302, which may be particularly advantageous for housings that are made of plastic as plastic may be susceptible to cracking from stress-induced fatigue. In some embodiments, the first and second beams 110, 210 may be relatively thicker than conventional beams and may have a higher current-carrying capability than conventional beams, without increasing an amount of insertion force needed to insert a PCB into the card-insertion opening 302, due to the increased flexibility resulting from the presence of the thin skiving sections 110*a*, 210*a*. In some embodiments an increase of approximately 15% in current is achievable for beam dimension of approximately 7.6 mm. For example, a current of about 52 A (amperes) may be achievable for the first beam 110 and/or the second beam 210 compared to a current of about 45 A for a conventional beam.

According to some embodiments of the present technology, an overall length L1 of the first finger plate 100 may be greater than an overall length L2 of the second finger plate 200. In some embodiments, the tip 104*t* at a distal end of the hook at the first end 104*a* of the first finger 104 may face the tip 204*t* at the first end 204*a* of the second finger 204, as depicted in FIG. 7B. In some embodiments, the contact surfaces 11*a*, 11*b* of the first fingers 104 may be located on the hooks at the first ends 104*a* of the first fingers 104, as depicted in FIGS. 7B and 8B. In some embodiments, the contact surfaces 21*a*, 21*b* of the second fingers 204 may be located on curved portions at the first ends 204*a* of the second fingers 204, as depicted in FIGS. 7B and 9C. In some embodiments, for a pair of terminals 10*a*, 10*b*, the contact surfaces 11*a*, 21*a* of the terminal 10*a* may be coplanar and may be configured to contact a first surface of a PCB inserted in the card-insertion opening 302, and the contact surfaces 11*b*, 21*b* of the terminal 10*b* may be coplanar and may be configured to contact a second surface of the PCB inserted in the card-insertion opening 302.

According to some embodiments of the present technology, one or more of the terminals 10 may be incorporated in the connector 1 via a friction fit, without the need to use glue or cement or another adhesive to keep the first and second joining plates 102, 202 together and without the need to perform welding or bonding or another joining technique to keep the first and second joining plates 102, 202 together. As noted above, the first and second joining plates 102, 202 may be joined together via mating of the first engagement portion 106 with the second engagement portion 206, to form the terminal 10. The first and second joining plates 102, 202 of the terminal 10 may be held together by surfaces of the housing 300.

As noted above, the housing 300 may comprise the left wall 300L, the right wall 300R, the front wall 300F, and the rear wall 300B, which may serve as boundary walls of a cavity of the connector 1, according to some embodiments of the present technology. A PCB may be inserted into the cavity of the connector 1 via the card-insertion opening 302 located at a top side of the housing 300 (see FIGS. 2A and 2G). Also as noted above, the terminals 10 may be disposed in the compartments 304 of the housing 300, with the compartments 304 being delimited by the separation wall 320 and the lateral portions 320*a* of the separation wall 320, according to some embodiments.

According to some embodiments of the present technology, the connector 1 may be manufactured by inserting the terminals 10 into the compartments 304 of the housing 300 through a bottom side of the housing 300, as depicted in FIG. 4B. For example, the first row R1 of terminals 10*a* may be inserted in the first row S1 of compartments 304*a*, and the second row R2 of terminals 10*b* may be inserted in the second row S2 of compartments 304*b*. In some embodiments, one or more of the compartments 304 may each comprise a slot 306 sized to fit the first and second joining plates 102, 202 therein such that the first and second joining plates 102, 202 for a friction fit with surfaces of the slot 306. In some embodiments, some of the surfaces of the slots 306 may be defined by recesses in the lateral portions 320*a* of the separation wall 320, as depicted in FIGS. 5A, 5B, 6B, and 6D.

According to some embodiments of the present technology, one or more of the compartments 304*a* of the first row S1 may each comprise a slot 306*a* configured to support and hold together the first and second joining plates 102, 202 of a terminal 10*a*. In some embodiments, the slot 306*a* may comprise a pair of slot endwalls 308*a* located on opposite sides of the slot 306*a* and configured to limit an insertion distance of the terminal 10*a* into the slot 306*a*. For example, one of the slot endwalls 308*a* may be located on a left side of the slot 306*a*, and the other of the slot endwalls 308*a* may be located on a right side of the slot 306*a*. The slot endwalls 308*a* may be configured to engage with shoulders 25 on one of or both of the first and second joining plates 102, 202 of the terminal 10*a*, to prevent the terminal 10*a* from being inserted beyond the position set by the slot endwalls 308*a*. In some embodiments, the slot 306*a* may comprise a first slot wall 312*a* configured to face the first finger plate 100 of the terminal 10*a*, and may comprise a pair of slot ledges 310*a* configured to face the second finger plate 200 of the terminal 10*a*, when the terminal 10*a* is positioned in the slot 306*a*. In some embodiments, one of the slot ledges 310*a* may be contiguous with the slot endwall 308*a* on the left side of the slot 306*a*, and the other of the slot ledges 310*a* may be contiguous with the slot endwall 308*a* on the right side of the slot 306*a*. In some embodiments, recesses in the lateral portions 320*a* of the separation wall 320 may form the slot endwalls 308*a* and the slot ledges 310*a*. In some embodiments, the first slot wall 312*a* and the slot ledges 310*a* may exert a compressive force on the first and second joining plates 102, 202 such that the first and second joining plates 102, 202 may be held together and pushed against each other without the need for welding or fusing or another joining technique to be performed and without the need for glue or tape or another adhesive to be applied. In some embodiments, the protrusions 208 on the second joining plate 202 may press against and form a friction fit with the ledges 310*a*. In some embodiments, when the terminal 10*a* is positioned in the slot 306*a*, a portion of the second joining plate 202 may be exposed in the compartment 304*a*, as depicted in FIGS. 5A and 5B. A space between the separation wall 320 and the second joining plate 202 may be used by, e.g., a power cable (not shown) to make electrical contact with the terminal 10*a*.

According to some embodiments of the present technology, one or more of the compartments 304*b* of the first row S2 may each comprise a slot 306*b* configured to support and hold together the first and second joining plates 102, 202 of a terminal 10*b*. In some embodiments, the slot 306*b* may be a mirror image of the slot 306*a*. In some embodiments, the slot 306*b* may comprise a pair of slot endwalls 308*b* located on opposite sides of the slot 306*b* and configured to limit an insertion distance of the terminal 10*b* into the slot 306*b*. For example, one of the slot endwalls 308*b* may be located on a left side of the slot 306*b*, and the other of the slot endwalls 308*b* may be located on a right side of the slot 306*b*. The slot endwalls 308*b* may be configured to engage with shoulders 25 on one of or both of the first and second joining plates 102, 202 of the terminal 10*b*, to prevent the terminal 10*b* from being inserted beyond the position set by the slot endwalls 308*b*. In some embodiments, the slot 306*b* may comprise a second slot wall 312*b* configured to face the first finger plate 100 of the terminal 10*b*, and may comprise a pair of slot ledges 310*b* configured to face the second finger plate 200 of the terminal 10*b*, when the terminal 10*b* is positioned in the slot 306*b*. In some embodiments, one of the slot ledges 310*b* may be contiguous with the slot endwall 308*b* on the left side of the slot 306*b*, and the other of the slot ledges 310*b* may be contiguous with the slot endwall 308*b* on the right side of the slot 306*b*. In some embodiments, recesses in the lateral portions 320*a* of the separation wall 320 may form the slot endwalls 308*b* and the slot ledges 310*b*. In some embodiments, the second slot wall 312*b* and the slot ledges 310*b* may exert a compressive force on the first and second joining plates 102, 202 such that the first and second joining plates 102, 202 may be held together and pushed against each other without the need for welding or fusing or another joining technique to be performed and without the need for glue or tape or another adhesive to be applied. In some embodiments, the protrusions 208 on the second joining plate 202 may press against and form a friction fit with the ledges 310*b*. In some embodiments, when the terminal 10*b* is positioned in the slot 306*b*, a portion of the second joining plate 202 may be exposed in the compartment 304*b*, as depicted in FIGS. 5A and 5B. A space between the separation wall 320 and the second joining plate 202 may be used by, e.g., a power cable (not shown) to make electrical contact with the terminal 10*b*.

According to some embodiments of the present technology, the terminal 10 comprises two parts, i.e., the first finger plate 100 and the second finger plate 200, but advantageously may be assembled into a unit and incorporated into the housing 300 without the need for adhesives to hold the two parts together and without the need for joining techniques to be performed to hold the two parts together. As noted above, the first finger plate 100 may comprise the first engagement portions 106 structured to mate with the second engagement portions 206 of the second finger plate 200. For example, the second engagement portions 206 may be protrusions 206 and the first engagement portions 106 may be recesses 106 sized and shaped to fit the protrusions 206 therein snugly, to fix a position of the first finger plate 100 relative to the second finger plate 100. The connector 1 may be manufactured by inserting one or more of the terminals 10, each formed of the first and second finger plates 100, 200 mated together, into one or more of the compartments 304, respectively.

According to some embodiments of the present technology, a first terminal 10*a* may be incorporated in a compartment 304*a* of the housing 300 by holding the first and second joining plates 102, 202 together while inserting the fingers 104, 204 of the terminal 10*a* into the compartment 304*a*, with the terminal 10*a* being oriented such that the first finger plate 100 faces the first slot wall 312*a*, and then sliding the first and second joining plates 102, 202 into a slot 306*a* of the compartment 304*a* until shoulders 25 on opposite sides of the terminal 10*a* contact slot endwalls 308*a* on opposite sides of the slot 306*a*. During the sliding, slot ledges 310*a* on opposite sides of the slot 306*a* may engage with and support edge portions on opposite sides of the second joining plate 202. Protrusions 208 on the second joining plate 202 may contact and slide along the slot ledges 310*a* during the sliding. In a fully inserted position, the shoulders 25 of the terminal 10*a* may abut the slot endwalls 308*a*, the protrusions 208 of the terminal 10*a* may abut the slot ledges 310*a*, and one or more portions of the first joining plate 102 may abut the first slot wall 312*a*. In the fully inserted position, the contact surfaces 11*a*, 21*a* of the terminal 10*a* may be positioned to form part of a first side of the card-insertion opening 302 of the connector 1. A plurality of terminals 10*a* may be incorporated in a plurality of compartments 304*a* of the housing 300 in a similar manner to form the first row R1 of terminals 10*a*, with the contact surfaces 11*a*, 21*a* of the terminals 10*a* being positioned to form the first side of the card-insertion opening 302 of the connector 1.

The above technique for incorporating the first terminal 10*a* in the housing 300 may be used to incorporate a second terminal 10*b* in the housing 300. More specifically, the terminal 10*b* may be incorporated in a compartment 304*b* of the housing 300 by holding the first and second joining plates 102, 202 together while inserting the fingers 104, 204 of the terminal 10*b* into the compartment 304*b*, with the terminal 10*b* being oriented such that the first finger plate 100 faces the second slot wall 312*b*, and then sliding the first and second joining plates 102, 202 into a slot 306*b* of the compartment 304*b* until shoulders 25 on opposite sides of the terminal 10*b* contact slot endwalls 308*b* on opposite sides of the slot 306*b*. During the sliding, slot ledges 310*b* on opposite sides of the slot 306*b* may engage with and support edge portions on opposite sides of the second joining plate 202. Protrusions 208 on the second joining plate 202 may contact and slide along the slot ledges 310*b* during the sliding. In a fully inserted position, the shoulders 25 of the terminal 10*b* may abut the slot endwalls 308*b*, the protrusions 208 of the terminal 10*b* may abut the slot ledges 310*b*, and one or more portions of the first joining plate 102 may abut the second slot wall 312*b*. In the fully inserted position, the contact surfaces 11*b*, 21*b* of the terminal 10*b* may be positioned to form part of a second side of the card-insertion opening 302 of the connector 1. A plurality of terminals 10*b* may be incorporated in a plurality of compartments 304*b* of the housing 300 in a similar manner to form the second row R2 of terminals 10*b*, with the contact surfaces 11*b*, 21*b* of the terminals 10*b* being positioned to form the second side of the card-insertion opening 302 of the connector 1, opposite to the first side formed of the contact surfaces 11*a*, 21*a* of the terminals 10*a*.

The terminals 10 (10*a*, 10*b*) may have tail portions for connection of the terminal to a printed circuit board, a cable, or another type of substrate. The tail portions, for example, may be shaped as posts extending from a surface 102*c* or a surface 202*c*, or from both of the surfaces 102*c*, 202*c*. For example, the posts may be straight and may be configured to be press-fit or to extend through through-holes, or may have an angled (e.g., right-angle) foot and may be configured to be press-fit or to extend through through-holes. Such tail portions are not expressly shown for simplicity of illustration. The tail portions alternatively or additionally may have other shapes to facilitate other mounting techniques to a PCB or for mounting to other types of substrates. For example, flat or blunt bottom surfaces 102*c*, 202*c* of the first and second joining plates 102, 202, may serve as tail portions. In such a configuration, the connector 1 may be mounted on a support board (not shown) comprised of a plurality of conductors arranged to electrically contact the bottom surfaces 102*c*, 202*c* of the terminals 10. For example, the conductors of the support board may be configured to be soldered to the bottom surfaces 102*c*, 202*c*. As will be appreciated, other configurations for the tail portions are possible (e.g., straddle-mount configurations) and may be used with the present technology. In some embodiments, the compartments 304 (304*a*, 304*b*) of the connector 1 may comprise spaces 304*c* not occupied by the first and joining plates 102, 202. The spaces 304*c* may be configured to receive conductors (not shown) sized to fit into the spaces 304*c* and electrically contact the second joining plates 202.

As will be appreciated, the tail portions of the terminals 10 need not be configured as blunt ends of the first and second joining plates 102, 202 but may have another configuration. For example, the tail portions of the terminals 10 may comprise at least one tail extension extending from the first joining plate 102 and/or the second joining plate 202 and configured to extend into a hole of a support board (not shown) or configured to be attached to conductors on a surface of a support board (not shown). In some implementations of this example, the tail portions may have a shape and/or a curvature suitable for mounting in holes or on conductor surfaces.

KEY TO REFERENCE NUMERALS

1 card edge connector
2 PCB (card)
2*a* contact pad
2*b* insertion edge
10 terminal
10*a* first terminal of a pair (10*a*, 10*b*) of terminals
10*b* second terminal
10*f* finger
11*a* contact surface of 100 of 10*a*
11*b* contact surface of 100 of 10*b*
21*a* contact surface of 200 of 10*a*
21*b* contact surface of 200 of 10*b*
25 shoulder
R1 first row of terminals
R2 second row of terminals
100 first finger plate
102 first joining plate
102*a* first (inner) side of first joining plate
102*b* second side of first joining plate

102*c* bottom surface
104 first finger
104*a* first (free) end of first finger
104*b* second end of first finger
104*t* tip of first end
106 first engagement portion
110 first beam joining the first and second ends of the first finger
110*a* thin skiving section of first beam
t1 thickness of first finger at 110
t2 thickness of first finger at thin skiving section 110*a*
t3 thickness of second finger at 210
t4 thickness of second finger at thin skiving section 210*a*
L1 length of first finger plate
L2 length of second finger plate
200 second finger plate
202 second joining plate
202*a* first side of second joining plate
202*b* second (inner) side of second joining plate
202*c* bottom surface
204 second finger
204*a* first (free) end of second finger
204*b* second end of first finger
204*t* tip of first end
206 second engagement portion
208 protrusion
210 second beam joining the first and second ends of the second finger
210*a* thin skiving section of second beam
300 housing
300L left wall
300R right wall
300F front wall
300B back/rear wall
301F surface ledge
301B surface recess
302 card-insertion opening
303F through-hole
303B through-hole
304 terminal compartment
304*a* first compartment
304*b* second compartment
304*c* compartment space
306 terminal slot
306*a* first terminal slot
306*b* second terminal slot
308*a* first slot endwall
308*b* second slot endwall
310*a* first slot ledge
310*b* second slot ledge
312*a* first slot wall
312*b* second slot wall
320 separation wall
320*a* lateral portion of separation wall
320*b* internal edge of separation wall
S1 first row of terminal slots (for 10*a*)
S2 second row of terminal slots (for 10*b*)

CONCLUSION

The foregoing features may be used, separately or together in any combination, in any of the embodiments discussed herein.

Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

Variations on the disclosed embodiments are possible and are within the scope of the present disclosure. For example, although the terminals 10 are shown in the drawings to have blunt tail portions, the terminals 10 may be provided with other types of tail portions without departing from the scope of the disclosed technology, including posts or pressfits. In another example, although mechanical friction alone may be sufficient to retain a terminal 10 in a compartment 304, the terminal 10 may be retained in the compartment 304 by friction in conjunction with one or more joining techniques, such as, e.g., a spot weld, a solder joint, and the like, without departing from the scope of the disclosed technology.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. A terminal for an electrical connector, the terminal comprising:
- an electrically conductive first finger plate comprising a first joining plate and a plurality of first fingers extending from the first joining plate, the first fingers comprising first ends spaced apart from each other and second ends connected to the first joining plate; and
- an electrically conductive second finger plate comprising a second joining plate and a plurality of second fingers extending from the second joining plate, the second fingers comprising first ends spaced apart from each other and second ends connected to the second joining plate,
- wherein:
  - the first ends of the first fingers are spaced apart from the first ends of the second fingers,
  - a total number of the second fingers of the second finger plate is different from a total number of the first fingers of the first finger plate,
  - a plurality of first engagement portions disposed on a first side of the first joining plate are engaged with a plurality second engagement portions disposed on a second side of the second joining plate such that the first and second joining plates are mated in a fixed position relative to each other, and
  - a plurality of protrusions extend from a first side of the second joining plate, the plurality of protrusions protruding from a thickness of the second joining plate, the first side of the second joining plate being opposite to the second side of the second joining plate.

2. The terminal of claim 1, wherein, for at least some of the first fingers, the first end is separated from the second end by an elongated first beam comprising at least one skiving section having a thickness less than a thickness of a remainder of the first beam.

3. The terminal of claim 2, wherein:
- the at least one skiving section of the first beam is located in a section proximate the first joining plate, and
- the thickness of the at least one skiving section of the first beam is between 25% and 35% less than the thickness of the remainder of the first beam.

4. The terminal of claim 2, wherein, for at least some of the second fingers, the first end is separated from the second end by an elongated second beam comprising at least one skiving section having a thickness less than a thickness of a remainder of the second beam.

5. The terminal of claim 4, wherein the at least one skiving section of the second beam is formed of at least one recess facing towards the first finger plate.

6. The terminal of claim 4, wherein:
- the at least one skiving section of the second beam is located in a section proximate the second joining plate, and
- the thickness of the at least one skiving section of the second beam is between 25% and 35% less than the thickness of the remainder of the second beam.

7. The terminal of claim 1, wherein:
- the first engagement portions comprise recesses in the first joining plate, and
- the second engagement portions comprise protrusions extending from the second joining plate and seated in the recesses in the first joining plate.

8. The terminal of claim 1, wherein a length of the first finger plate is greater than a length of the second finger plate.

9. The terminal of claim 1, wherein:
- for at least some of the first fingers, the first end comprises a hook and a tip at a distal end of the hook,
- for at least some of the second fingers, the first end comprises a tip, and
- portions of the tips of the first fingers face towards the tips of the second fingers.

10. The terminal of claim 1, wherein a thickness of the first fingers is between 25% and 30% greater than a thickness of the second fingers.

11. The terminal of claim 1, wherein:
- for at least some of the first fingers, the first end of the first finger has a first contact surface configured to contact a first side of a connector card, and
- for at least some of the second fingers, the first end of the second finger has a second contact surface configured to contact the first side of the connector card, the first contact surface being different from the second contact surface.

12. The terminal of claim 11, wherein, for at least some of the first fingers:
- an elongate straight first beam connects the first and second ends of the first finger, and a surface of the first beam is coplanar with a surface of the first joining plate.

13. The terminal of claim 11, wherein, for at least some of the second fingers:

an elongate second beam connects the first and second ends of the second finger, and the second beam and the second joining plate are not parallel to each other.

14. The terminal of claim 1, wherein the first and second finger plates are configured to be held together in a insulative housing of the connector without an adhesive and without being fused together by a joining technique.

15. The terminal of claim 14, wherein the protrusions extending from the first side of the second joining plate are configured to abut against at least one surface of the housing.

16. The terminal of claim 14, wherein the first joining plate comprises shoulder portions configured to limit an insertion distance of the first and second joining plates in the housing.

17. The terminal of claim 14, wherein the second joining plate comprises shoulder portions configured to limit an insertion distance of the first and second joining plates in the housing.

18. The terminal of claim 1, wherein the electrical connector further comprises an insulative housing comprising a terminal compartment in which the first and second finger plates are disposed, the compartment comprising a slot sized to fit the first and second joining plates therein such that:

slot endwalls limit an insertion distance of the first and second finger plates into the housing, and slot ledges abut the protrusions extending from the first side of the second joining plate.

19. The terminal of claim 18, wherein:

the housing comprises a slot wall parallel to the slot ledges, and the slot ledges and the slot wall exert a compressive force on the first and second joining plates disposed in the slot.

20. An electrical connector, comprising:

an insulative housing; and a plurality of electrically conductive first terminals disposed in the housing, wherein each of the first terminals comprises:

an electrically conductive first finger plate comprising a first joining plate and a plurality of first fingers extending from the first joining plate, the first fingers comprising first ends spaced apart from each other and second ends connected to the first joining plate; and an electrically conductive second finger plate comprising a second joining plate and a plurality of second fingers extending from the second joining plate, the second fingers comprising first ends spaced apart from each other and second ends connected to the second joining plate, wherein, for each of the first terminals:

the first ends of the first fingers are spaced apart from the first ends of the second fingers, a total number of the second fingers of the second finger plate is different from a total number of the first fingers of the first finger plate, a plurality of first engagement portions disposed on a first side of the first joining plate are engaged with a plurality second engagement portions disposed on a second side of the second joining plate such that the first and second joining plates are mated together in a fixed position relative to each other, and a plurality of protrusions extend from a first side of the second joining plate, the first side of the second joining plate being opposite to the second side of the second joining plate, and wherein the housing comprises a plurality of first compartments in which the first terminals are disposed, each of the first compartments comprising a first slot sized to fit the first and second joining plates of a corresponding one of the first terminals therein such that:

first slot endwalls of the first slot limit an insertion distance of the first and second finger plates of the first terminal into the first compartment, and first slot ledges of the first slot abut the protrusions extending from the first side of the second joining plate of the first terminal.

21. The electrical connector of claim 20, wherein the first and second finger plates of the first terminal are configured to be held together in the first slot of the first compartment without an adhesive and without being fused together by a joining technique.

22. The electrical connector of claim 20, wherein the protrusions extending from the first side of the second joining plate of the first terminal are configured to abut against at least one surface of the housing.

23. The electrical connector of claim 20, wherein the first joining plate of the first terminal comprises shoulder portions configured to limit an insertion distance of the first and second joining plates of the first terminal in the housing.

24. The electrical connector of claim 20, wherein the second joining plate of the first terminal comprises shoulder portions configured to limit an insertion distance of the first and second joining plates of the first terminal in the housing.

25. The electrical connector of claim 20, wherein:

the first slot comprises a first slot wall parallel to the first slot ledges, and the first slot ledges and the first slot wall exert a compressive force on the first and second joining plates of the first terminal disposed in the first compartment.

26. An electrical connector, comprising:

an insulative housing;

a plurality of electrically conductive first terminals disposed in the housing, wherein each of the first terminals comprises:

an electrically conductive first finger plate comprising a first joining plate and a plurality of first fingers extending from the first joining plate, the first fingers comprising first ends spaced apart from each other and second ends connected to the first joining plate; and an electrically conductive second finger plate comprising a second joining plate and a plurality of second fingers extending from the second joining plate, the second fingers comprising first ends spaced apart from each other and second ends connected to the second joining plate, wherein, for each of the first terminals:

a plurality of first engagement portions disposed on the first joining plate are engaged with a plurality second engagement portions disposed on the second joining plate, and a plurality of protrusions extend from a first side of the second joining plate, and wherein the housing comprises a plurality of first compartments in which the first terminals are disposed, each of the first compartments comprising a first slot sized to fit the first and second joining plates of a corresponding one of the first terminals therein such that:

first slot endwalls of the first slot limit an insertion distance of the first and second finger plates of the first terminal into the first compartment, and first slot ledges of the first slot abut the protrusions extending from the first side of the second joining plate of the first terminal; and a plurality of electrically conductive second terminals disposed in the housing, the second terminals having a same structure as the first terminals, wherein the housing comprises a plurality of second compartments in which the second terminals are disposed, each of the second compartments comprising a second slot sized to fit first and second joining plates of a corresponding one of the second terminals therein such that:

second slot endwalls of the second slot limit an insertion distance of first and second finger plates of the second terminal into the second compartment, and second slot ledges abut the protrusions extending from the first side of the second joining plate of the second terminal.

27. The electrical connector of claim 26, wherein:

for each of the first terminals:

the first ends of the first fingers have first contact surfaces configured to contact a first side of a card when the card is inserted in the housing, and the first ends of the second fingers have second contact surfaces configured to contact the first side of the card when the card is inserted in the housing, the first contact surfaces being different from the second contact surfaces, and the first and second contact surfaces of the first terminals form a first side of a card-insertion opening in the housing.

28. The electrical connector of claim 27, wherein:

for each of the second terminals, first and second contact surfaces are configured to contact second side of the card when the card is inserted in the housing, and the first and second contact surfaces of the second terminals form a second first side of the card-insertion opening in the housing.

29. The electrical connector of claim 28, wherein, when a card is not inserted in the card-insertion opening, the first and second contact surfaces of the first terminals face the first and second contact surfaces of the second terminals.

30. The electrical connector of claim 26, wherein:

the first compartments are arranged in a first row of the housing, and the first terminals are disposed in the first compartments in a first terminal row, the second compartments are arranged in a second row of the housing, and the second terminals are disposed in the second compartments in a second terminal row, a card-insertion opening is formed between the first and second terminal rows, and the second finger plates of the first and second terminals are closer to the card-insertion opening than the first finger plates of the first and second terminals.

31. The electrical connector of claim 30, wherein the first terminal row is a mirror image of the second terminal row.

32. The electrical connector of claim 30, wherein:

the first and second fingers of the first terminals of the first terminal row are configured to contact a first side of a card when the card is inserted in the card-insertion opening, and first and second fingers of the second terminals of the second terminal row are configured to contact a second side of the card when the card is inserted in the card-insertion opening.

33. A method of manufacturing an electrical connector, the method comprising:

(a) inserting a first end of an electrically conductive first terminal into a first compartment of an insulative housing, the first end of the first terminal comprising a plurality of first fingers and a plurality of second fingers;

(b) after the inserting of the first end of the first terminal, inserting first and second joining plates of the first terminal into a first slot of the first compartment; and (c) seating the first and second joining plates of the first terminal in the first slot such that portions of lateral edges of the first and second joining plates of the first terminal abut first slot endwalls and such that opposite surfaces of the first slot prevent the first and second joining plates of the first terminal from separating from each other.

34. The method of claim 33, wherein the seating of the first and second joining plates comprises sliding the first and second joining plates into the first slot such that first slot ledges of the first slot abut a plurality of protrusions extending from a surface of the joining plates of the first terminal.

35. The method of claim 33, further comprising:

(d) inserting a first end of an electrically conductive second terminal into a second compartment of the housing, the first end of the second terminal comprising a plurality of first fingers and a plurality of second fingers;

(e) after the inserting of the first end of the second terminal, inserting first and second joining plates of the second terminal into a second slot of the second compartment; and (f) seating the first and second joining plates of the second terminal in the second slot such that portions of lateral edges of the first and second joining plates of the second terminal abut second slot endwalls and such that opposite surfaces of the second slot prevent the first and second joining plates of the second terminal from separating from each other.

36. The method of claim 35, further comprising:

performing (a), (b), and (c) a plurality of times for a plurality of electrically conductive first terminals to produce a first row of terminals disposed in a first row of compartments; and performing (d), (e), and (f) a plurality of times for a plurality of electrically conductive second terminals to produce a second row of terminals disposed in a second row of compartments, wherein the first row of terminals is parallel to second row of terminals such that a card-insertion opening is formed between contact surfaces of the first row of terminals and contact surfaces of the second terminal row of terminals.

37. A method of manufacturing an electrical connector, the method comprising:

(a) inserting a first end of an electrically conductive first terminal into a first compartment of an insulative housing, the first end of the first terminal comprising a plurality of first fingers and a plurality of second fingers;

(b) after the inserting of the first end of the first terminal, inserting first and second joining plates of the first terminal into a first slot of the first compartment; and (c) seating the first and second joining plates of the first terminal in the first slot such that opposite surfaces of the first slot prevent the first and second joining plates of the first terminal from separating from each other, wherein the seating of the first and second joining plates comprises sliding the first and second joining plates into the first slot such that first slot ledges of the first slot face the joining plates of the first terminal, wherein, after the seating of the first and second joining plates, the first slot ledges and a first slot wall of the housing exert a compressive force on the first and second joining plates, the first slot wall being parallel to the first slot ledges.

38. The method of claim 37, further comprising:

joining a first finger plate to a second finger plate to form the first terminal, wherein:

the first finger plate comprises the first joining plate, and the first fingers extend from the first joining plate, and the second finger plate comprises the second joining plate, and the second fingers extend from the second joining plate.

39. The method of claim 38, wherein:

sliding the first and second joining plates into the first slot such that first slot ledges of the first slot abut the joining plates of the first terminal comprises sliding the first and second joining plates into the first slot such that first slot ledges of the first slot abut a plurality of protrusions extending from a surface of the joining plates of the first terminal;

the joining of the first and second finger plates comprises engaging a plurality of first engagement portions disposed on a first side of the first joining plate with a plurality second engagement portions disposed on a first side of the second joining plate such that the first and second joining plates are in a fixed position relative to each other, and the protrusions are located on a second side of the second joining plate and abut the first slot ledges of the first slot.

40. A terminal for an electrical connector, the terminal comprising:

an electrically conductive first finger plate comprising a first joining plate having a first side and a second side and a plurality of first fingers extending from the first joining plate, the first fingers comprising first ends spaced apart from each other and second ends connected to the first joining plate; and an electrically conductive second finger plate comprising a second joining plate having a first side and a second side and a plurality of second fingers extending from the second joining plate, the second fingers comprising first ends spaced apart from each other and second ends connected to the second joining plate, wherein a plurality of first engagement portions disposed on the first joining plate are engaged with a plurality second engagement portions disposed on the second joining plate, for at least some of the first fingers, the first end is separated from the second end by an elongated first beam comprising at least one skiving section having a thickness less than a thickness of a remainder of the first beam; and the at least one skiving section of the first beam is formed of at least one recess facing in a same direction as the second side of the first joining plate.

* * * * *